US010782982B2

(12) United States Patent
Nagata

(10) Patent No.: US 10,782,982 B2
(45) Date of Patent: Sep. 22, 2020

(54) INFORMATION PROCESSING APPARATUS AND SYSTEM, AND METHOD AND RECORDING MEDIUM FOR GENERATING USER INTERFACE

(71) Applicant: OMRON Corporation, Kyoto (JP)

(72) Inventor: Yuta Nagata, Kusatsu (JP)

(73) Assignee: OMRON Corporation, Kyoto (JP)

(*) Notice: Subject to any disclaimer, the term of this patent is extended or adjusted under 35 U.S.C. 154(b) by 283 days.

(21) Appl. No.: 15/820,452

(22) Filed: Nov. 22, 2017

(65) Prior Publication Data

US 2018/0232244 A1 Aug. 16, 2018

(30) Foreign Application Priority Data

Feb. 10, 2017 (JP) ................ 2017-023015

(51) Int. Cl.
*G06F 3/0481* (2013.01)
*G06F 9/451* (2018.01)
(Continued)

(52) U.S. Cl.
CPC ......... *G06F 9/451* (2018.02); *G05B 19/0423* (2013.01); *G06F 3/04817* (2013.01);
(Continued)

(58) Field of Classification Search
CPC .. G06F 3/0485; G06F 3/0481; G06F 3/04817; G06F 9/451; G06F 8/38;
(Continued)

(56) References Cited

U.S. PATENT DOCUMENTS 5,844,554 A 12/1998 Geller et al.
7,640,098 B2 * 12/2009 Stenbock ............... G01C 21/00
340/995.1
(Continued)

FOREIGN PATENT DOCUMENTS

CN 103197737 A * 7/2013
JP 2016506559 3/2016
WO 2014083322 6/2014

OTHER PUBLICATIONS

"Search Report of Europe Counterpart Application", dated Jun. 20, 2018, p. 1-p. 6.

*Primary Examiner* — Steven P Sax
(74) *Attorney, Agent, or Firm* — JCIPRNET

(57) ABSTRACT

An information processing apparatus includes: a display unit displaying a generation screen of a UI; a storage unit storing object images serving as candidates for configuring the UI; an operation receiving unit receiving a selection of arbitrary object images among the object images and receiving an operation for arranging the selected object images at arbitrary positions on the generation screen; and a build unit outputting an execution file configuring a UI including the object images arranged on the generation screen based on reception of a build instruction for the UI. When the build instruction is received in a state in which two or more object images are arranged on the generation screen the build unit generates a composite image including the two or more object images and further outputs coordinate information of each of the object images serving as composition sources inside the composite image and the composite image.

10 Claims, 18 Drawing Sheets

(51) Int. Cl.
  *G06F 8/38* (2018.01)
  *G05B 19/042* (2006.01)
  *G06F 3/0484* (2013.01)
  *G06T 11/60* (2006.01)
  *G06F 8/71* (2018.01)

(52) U.S. Cl.
  CPC ............ G06F 3/04842 (2013.01); G06F 8/38 (2013.01); G06T 11/60 (2013.01); G06F 8/71 (2013.01)

(58) Field of Classification Search
  CPC ........... G06F 8/71; G06F 3/0484; G09G 5/00; G05B 19/0423; G06T 11/60
  See application file for complete search history.

(56) References Cited

U.S. PATENT DOCUMENTS

| | | | | |
|---|---|---|---|---|
| 7,853,899 | B1* | 12/2010 | Damaschke | G06F 9/451 715/841 |
| 10,102,226 | B1* | 10/2018 | Cosic | G06F 16/5838 |
| 10,332,251 | B2* | 6/2019 | Reicher | G01N 29/0654 |
| 2002/0091991 | A1* | 7/2002 | Castro | G06F 9/06 717/106 |
| 2005/0015728 | A1* | 1/2005 | Ragan, Jr. | G06F 9/451 715/765 |
| 2005/0232486 | A1* | 10/2005 | Koyama | G06K 9/325 382/176 |
| 2007/0063972 | A1* | 3/2007 | Kawamura | G09G 5/14 345/156 |
| 2010/0020201 | A1* | 1/2010 | Chao | H04N 9/09 348/239 |
| 2011/0129143 | A1* | 6/2011 | Keating | H04N 13/117 382/154 |
| 2013/0073389 | A1* | 3/2013 | Heath | G06Q 50/01 705/14.54 |
| 2014/0282140 | A1* | 9/2014 | Balogh | G06F 17/2247 715/765 |
| 2014/0282250 | A1* | 9/2014 | Riddell | G06F 3/0485 715/830 |
| 2015/0212699 | A1* | 7/2015 | Weksler | G06F 3/04842 715/765 |
| 2015/0369623 | A1* | 12/2015 | Blumenberg | G06T 3/40 701/532 |
| 2016/0055662 | A1* | 2/2016 | Tomidokoro | G06F 16/4393 345/634 |
| 2016/0057359 | A1* | 2/2016 | Hoshino | H04N 5/272 348/239 |
| 2016/0162245 | A1* | 6/2016 | Choi | G06F 3/1446 345/1.3 |
| 2016/0259992 | A1* | 9/2016 | Knodt | G06K 9/6201 |
| 2016/0261794 | A1* | 9/2016 | Knodt | H04N 5/23293 |

* cited by examiner

124

| USER | PAGE | OBJECT IMAGE | USE STATUS (NUMBER OF TIMES OF USE) |
|---|---|---|---|
| USER A | 1 | IMAGE A | 0 |
| | | IMAGE B | 0 |
| | | ⋮ | ⋮ |
| | 2 | IMAGE B | 10 |
| | | IMAGE C | 15 |
| | | ⋮ | ⋮ |
| | ⋮ | ⋮ | ⋮ |
| USER B | 1 | IMAGE A | 20 |
| | | IMAGE B | 37 |
| | | ⋮ | ⋮ |
| | 2 | IMAGE B | 25 |
| | | IMAGE C | 28 |
| | | ⋮ | ⋮ |
| | ⋮ | ⋮ | ⋮ |
| ⋮ | ⋮ | ⋮ | ⋮ |

FIG. 15

INFORMATION PROCESSING APPARATUS AND SYSTEM, AND METHOD AND RECORDING MEDIUM FOR GENERATING USER INTERFACE

CROSS-REFERENCE TO RELATED APPLICATION

This application claims the priority benefit of Japanese Patent Application no. 2017-023015, filed on Feb. 10, 2017. The entirety of the above-mentioned patent application is hereby incorporated by reference herein and made a part of this specification.

BACKGROUND OF THE INVENTION

Field of the Invention

The disclosure relates to a technology for generating a user interface accepting an operation for an apparatus serving as a control target.

Description of Related Art

In various manufacturing fields, control apparatuses such as programmable logic controllers (PLCs) have been introduced. According to a manufacturing program designed in correspondence with a manufacturing apparatus, a manufacturing facility, or the like, a PLC controls production apparatuses of various kinds in a manufacturing field. An operation instruction for such a PLC is realized through a programmable display unit such as a human machine interface (HMI) configured to be able to communicate with the PLC.

By operating a user interface (hereinafter, referred to as a UI) displayed on a programmable display unit, an operator in a manufacturing field can remotely operate various production apparatuses. Relating to such a UI, in Japanese Patent Application National Publication No. 2016-506559 (Patent Document 1), an HMI displaying a plurality of objects such as buttons and text on a screen is disclosed. By performing a touch operation on each object displayed on the HMI, a user can output an instruction associated with the object to a production apparatus.

A UI used for operating a production apparatus is generated by a UI developing tool provided separately from a programmable display unit. A designer can develop various UIs corresponding to a manufacturing apparatus, a manufacturing facility, or the like by using an information processing apparatus such as a personal computer (PC) in which a UI developing tool is installed.

In a UI developing tool, a plurality of object images (for example, buttons or the like) serving as candidates for configuring a UI are prepared in advance. A developer can select an arbitrary object image among such object images and can arrange an object image at an arbitrary position on a generation screen of the UI. The developing tool performs a UI build process on the basis of reception of a build instruction and outputs a UI having object images arranged on a generated screen as its configuration. The output UI is transmitted to a programmable display unit. At this time, when object images configuring the UI are individually transmitted, the number of times of communication is increased, and the transmission time increases. Thus, a technology for decreasing the transmission time of object images included in a UI is desired.

[Patent Document 1] Published Japanese Translation No. 2016-506559 of the PCT International Publication

SUMMARY OF THE INVENTION

According to one or some of exemplary embodiments of the invention, there is provided an information processing apparatus capable of providing a development environment for generating a user interface for receiving an operation on an apparatus serving as a control target. The information processing apparatus includes: a display unit that is used for displaying a generation screen for generating the user interface; a storage unit that is used for storing a plurality of object images serving as candidates for configuring the user interface; an operation receiving unit that receives a selection of arbitrary object images among the plurality of object images and receives an operation for arranging the selected object images at arbitrary positions on the generation screen; and a build unit that outputs an execution file used for configuring a user interface including the object images arranged on the generation screen on the basis of reception of a build instruction for the user interface. When the build instruction is received in a state in which two or more object images among the plurality of object images are arranged on the generation screen, the build unit generates a composite image including the two or more object images and further outputs coordinate information of each of the object images serving as composition sources inside the composite image and the composite image.

According to one or some of exemplary embodiments of the invention, there is provided an information processing system adapted to provide a development environment for generating a user interface used for receiving an operation for an apparatus serving as a control target. The information processing system includes: a display unit that is used for displaying a generation screen for generating the user interface; a storage unit that is used for storing a plurality of object images serving as candidates for configuring the user interface; an operation receiving unit that receives a selection of arbitrary object images among the plurality of object images and receives an operation for arranging the selected object images at arbitrary positions on the generation screen; and a build unit that outputs an execution file used for configuring a user interface including object images arranged on the generation screen on the basis of reception of a build instruction for the user interface. When the build instruction is received in a state in which two or more object images among the plurality of object images are arranged on the generation screen, the build unit generates a composite image including the two or more object images and further outputs coordinate information of each of the object images serving as the composition sources inside the composite image and the composite image.

According to one or some of exemplary embodiments of the invention, there is provided a method for generating a user interface used for receiving an operation for an apparatus serving as a control target. The method includes: displaying a generation screen for generating the user interface; preparing a plurality of object images serving as candidates for configuring the user interface; receiving a selection of arbitrary object images among the plurality of object images and receiving an operation for arranging the selected object images at arbitrary positions on the generation screen; and outputting an execution file used for configuring a user interface including the object images arranged on the generation screen on the basis of reception of a build instruction for the user interface. The above-described outputting of the execution file includes generating a composite image including two or more object images and further outputting coordinate information of each of the object images serving as composition sources inside the composite image and the composite image when the build instruction is received in a state in which the two or more object images among the plurality of object images are arranged on the generation screen.

According to one or some of exemplary embodiments of the invention, there is provided a recording medium that stores a program for generating a user interface used for receiving an operation for an apparatus serving as a control target. The program causes a computer to perform: displaying a generation screen for generating the user interface; preparing a plurality of object images serving as candidates for configuring the user interface; receiving a selection of arbitrary object images among the plurality of object images and receiving an operation for arranging the selected object images at arbitrary positions on the generation screen; and outputting an execution file used for configuring a user interface including the object images arranged on the generation screen on the basis of reception of a build instruction for the user interface. The above-described outputting of the execution file includes generating a composite image including two or more object images and further outputting coordinate information of each of the object images serving as composition sources inside the composite image and the composite image when the build instruction is received in a state in which the two or more object images among the plurality of object images are arranged on the generation screen.

BRIEF DESCRIPTION OF THE DRAWINGS

FIG. 15 is a diagram illustrating an example of the data structure of history information according to the fourth embodiment.

DESCRIPTION OF THE EMBODIMENTS

Figure 1:
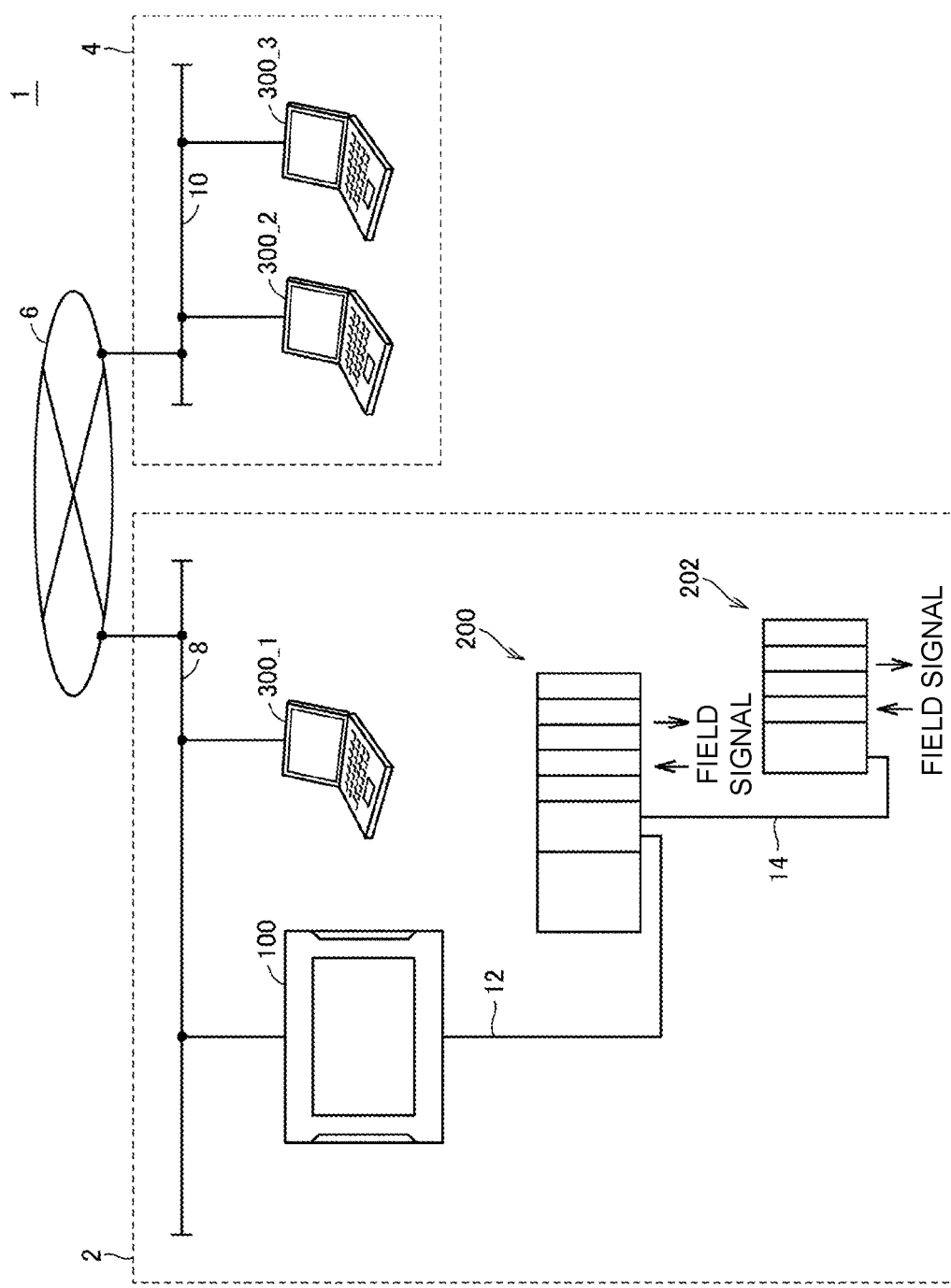
FIG. 1 is a schematic diagram illustrating the whole configuration of an information processing system according to a first embodiment.

According to one or some of exemplary embodiments of the invention, there is provided an information processing apparatus capable of providing a development environment for generating a user interface for receiving an operation on an apparatus serving as a control target. The information processing apparatus includes: a display unit that is used for displaying a generation screen for generating the user interface; a storage unit that is used for storing a plurality of object images serving as candidates for configuring the user interface; an operation receiving unit that receives a selection of arbitrary object images among the plurality of object images and receives an operation for arranging the selected object images at arbitrary positions on the generation screen; and a build unit that outputs an execution file used for configuring a user interface including the object images arranged on the generation screen on the basis of reception of a build instruction for the user interface. When the build instruction is received in a state in which two or more object images among the plurality of object images are arranged on the generation screen, the build unit generates a composite image including the two or more object images and further outputs coordinate information of each of the object images serving as composition sources inside the composite image and the composite image.

According to one or some of exemplary embodiments of the invention, the information processing apparatus described above further includes a configuration unit that, in a case in which an execution instruction for the execution file is received, acquires the object images that are the composition sources from the composite image on the basis of the coordinate information and arranges each of the object images that are the composition sources in the user interface.

According to one or some of exemplary embodiments of the invention, the build unit described above specifies a plurality of object images of which the numbers of times of being referred to inside the generation screen are relatively large among the two or more objects images arranged on the generation screen and generates the composite image from the plurality of object images.

According to one or some of exemplary embodiments of the invention, the information processing apparatus described above further includes an optimization unit that acquires history information defining a user's use status of each of the object images inside the user interface, specifies a plurality of object images of which the user's frequencies of use are high among the object images that are the composition sources on the basis of the use statuses, and generates the composite image from the plurality of object images again.

According to one or some of exemplary embodiments of the invention, the information processing apparatus described above further includes a selection receiving unit that receives an operation for selecting object images to be included in the composite image from among the object images arranged on the generation screen.

According to one or some of exemplary embodiments of the invention, there is provided an information processing system adapted to provide a development environment for generating a user interface used for receiving an operation for an apparatus serving as a control target. The information processing system includes: a display unit that is used for displaying a generation screen for generating the user interface; a storage unit that is used for storing a plurality of object images serving as candidates for configuring the user interface; an operation receiving unit that receives a selection of arbitrary object images among the plurality of object images and receives an operation for arranging the selected object images at arbitrary positions on the generation screen; and a build unit that outputs an execution file used for configuring a user interface including object images arranged on the generation screen on the basis of reception of a build instruction for the user interface. When the build instruction is received in a state in which two or more object images among the plurality of object images are arranged on the generation screen, the build unit generates a composite image including the two or more object images and further outputs coordinate information of each of the object images serving as the composition sources inside the composite image and the composite image.

According to one or some of exemplary embodiments of the invention, there is provided a method for generating a user interface used for receiving an operation for an apparatus serving as a control target. The method includes: displaying a generation screen for generating the user interface; preparing a plurality of object images serving as candidates for configuring the user interface; receiving a selection of arbitrary object images among the plurality of object images and receiving an operation for arranging the selected object images at arbitrary positions on the generation screen; and outputting an execution file used for configuring a user interface including the object images arranged on the generation screen on the basis of reception of a build instruction for the user interface. The above-described outputting of the execution file includes generating a composite image including two or more object images and further outputting coordinate information of each of the object images serving as composition sources inside the composite image and the composite image when the build instruction is received in a state in which the two or more object images among the plurality of object images are arranged on the generation screen.

According to one or some of exemplary embodiments of the invention, there is provided a recording medium that stores a program for generating a user interface used for receiving an operation for an apparatus serving as a control target. The program causes a computer to perform: displaying a generation screen for generating the user interface; preparing a plurality of object images serving as candidates for configuring the user interface; receiving a selection of arbitrary object images among the plurality of object images and receiving an operation for arranging the selected object images at arbitrary positions on the generation screen; and outputting an execution file used for configuring a user interface including the object images arranged on the generation screen on the basis of reception of a build instruction for the user interface. The above-described outputting of the execution file includes generating a composite image including two or more object images and further outputting coordinate information of each of the object images serving as composition sources inside the composite image and the composite image when the build instruction is received in a state in which the two or more object images among the plurality of object images are arranged on the generation screen.

According to one or some of exemplary embodiments of the invention, the transmission time of object images included in a UI can be decreased.

The above and other objects, features, aspects, and advantages of the exemplary embodiments will become apparent from the following detailed description relating to the invention understood with reference to the attached drawings.

Hereinafter, each embodiment of the invention will be described with reference to the drawings. In description presented below, the same reference sign will be assigned to the same components and the same constituent elements. The names and the functions thereof are the same. Thus, a detailed description thereof will not be repeated.

First Embodiment

A. Whole Configuration of Information Processing System 1

First, the whole configuration of an information processing system 1 according to this embodiment will be described. FIG. 1 is a schematic diagram illustrating the whole configuration of the information processing system 1 according to this embodiment. As illustrated in FIG. 1, the information processing system 1 includes a manufacturing site 2 at which a manufacturing operation is actually performed and a remote site 4 at which the manufacturing site 2 can be remotely viewed or operated. The manufacturing site 2 and the remote site 4 are connected through an arbitrary network 6 (for example, the Internet, a virtual private network (VPN), or the like). Communication between the manufacturing site 2 and the remote site 4 may be secured, and, typically, techniques for encrypting data to be transmitted and received and/or securing a communication line are employed.

At the manufacturing site 2, a controller 200 that controls a manufacturing apparatus, a robot, and the like and a programmable display unit 100 that is connected to the controller 200 are present.

The controller 200 is an industrial controller called a programmable logic controller (PLC), and transmits and receives field signals (input signals (analog and/or digital) detected by various sensors and output signals (analog and/or digital) applied to various actuators) with the apparatuses (manufacturing apparatuses, robots, and the like) serving as control targets not illustrated in the drawing, thereby controlling these apparatuses.

At the manufacturing site 2 illustrated in FIG. 1, a remote input/output (I/O) device 202 is connected to the controller 200 through a field bus 14. The remote I/O device 202 exchanges field signals with an apparatus to be controlled at a position remote from the controller 200.

The programmable display unit 100 is connected to the controller 200 through the field bus 12, displays information stored by the controller 200 to a user, and transmits an internal command to the controller 200 in accordance with an operation from a user. A human machine interface (HMI) screen displayed on the programmable display unit 100 can be arbitrarily generated by a user and, generally, is generated such that a screen or information corresponding to the manufacturing site 2 is displayed.

A display screen (in other words, a UI) of the programmable display unit 100 may be generated by an external apparatus (hereinafter, collectively referred to as an "information processing apparatus 300"). The external apparatus is not particularly limited as long as it is a device that can communicate with the programmable display unit 100 using a certain means, and, for example, a personal computer, a smartphone, another programmable display unit, or the like may be used. As the means for communicating with the programmable display unit 100, a known means such as universal serial bus (USB) communication, serial communication, parallel communication, a wired network (for example, Ethernet (registered trademark)), a radio network (for example, a wireless LAN or Bluetooth (registered trademark)), or the like may be used.

In the information processing system 1 illustrated in FIG. 1, a personal computer is illustrated as an example of the information processing apparatus 300, and such a personal computer is directly or indirectly connected to the programmable display unit 100 through a network. More specifically, an example is illustrated in which an information processing apparatus 300_1 connected to the programmable display unit 100 through a network 8 is present at the manufacturing site 2, and information processing apparatuses 300_2 and 300_3 connected to the programmable display unit 100 respectively through networks 6 and 10 are present at the remote site 4.

In each of the information processing apparatuses 300_1 to 300_3 (hereinafter, collectively referred to as an "information processing apparatus 300"), a UI developing tool used for generating a UI is installed. A developer can generate an arbitrary UI to be displayed on the programmable display unit 100 by using the UI developing tool. The UI generated by the information processing apparatus 300 is transmitted to the programmable display unit 100.

B. UI Developing Tool

In the information processing apparatus 300, a developing tool used for generating a UI to be displayed by the programmable display unit 100 is installed. The developing tool is, for example, Sysmac Studio produced by Omron Corp.

Figure 2:
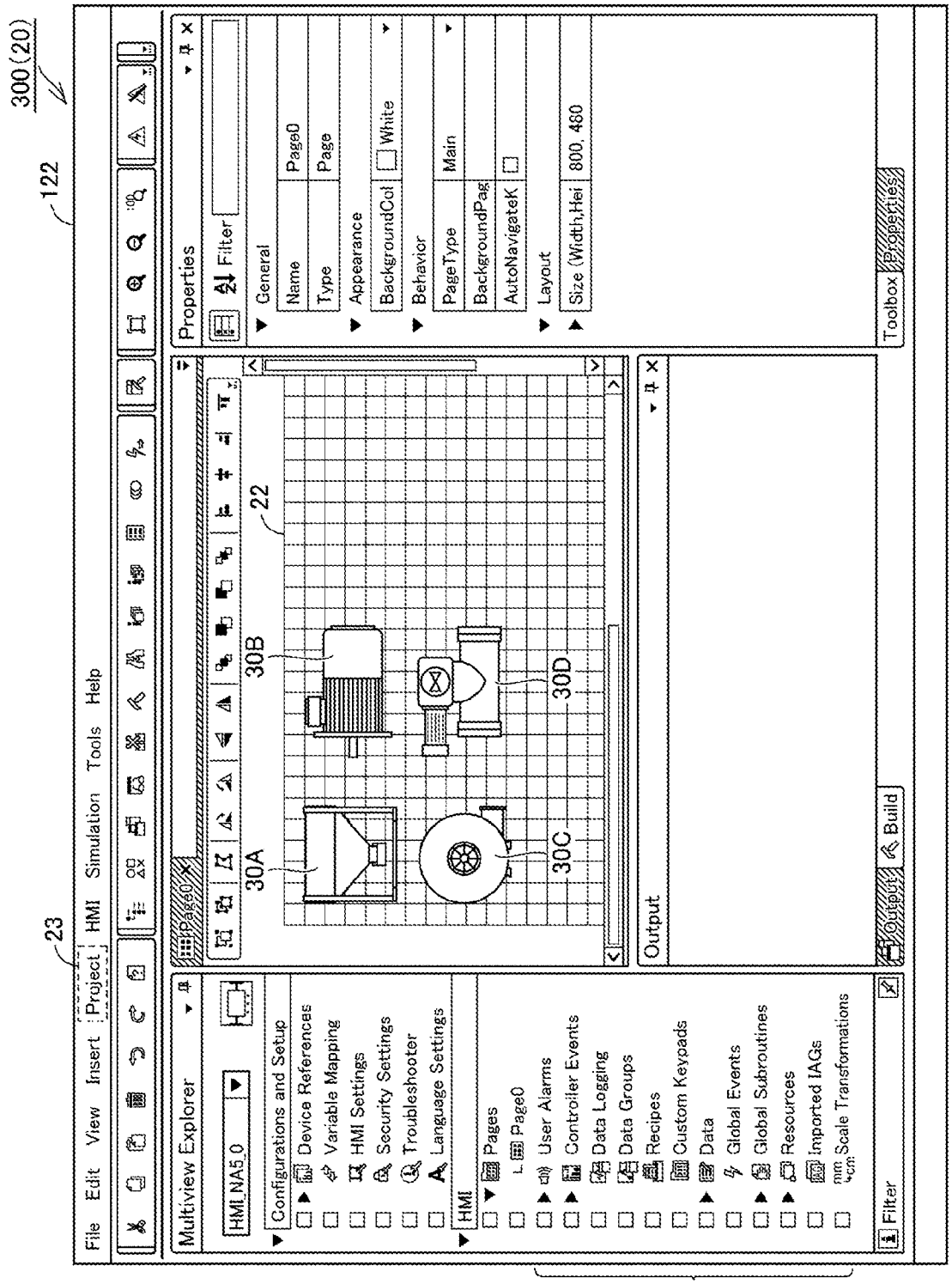
FIG. 2 is a diagram illustrating an example of a generation screen in a UI developing tool.

Hereinafter, the developing tool of the UI displayed by the programmable display unit 100 will be described with reference to FIG. 2. FIG. 2 is a diagram illustrating an example of a generation screen in a UI developing tool.

In the developing tool, object images serving as candidates for configuring a UI are prepared in advance. The object images, for example, are a button image, icon images representing various components of a production apparatus, and the other images (a still image or a moving image). Each object image is associated with a predetermined function. A designer can define an arbitrary function for each object image.

The object images are classified by type in an item group 21. When a designer selects any item of the item group 21, the designer can expand an object image group associated with the selected item. The designer can select any object image of the expanded object image group and arrange the selected object image at an arbitrary position in a work area 22. The selection operation or the arrangement operation for the object image is realized by a mouse operation, a touch operation, or the like. In the example illustrated in FIG. 2, object images 30A to 30D are arranged in a generation screen 20.

By pressing a build button (not illustrated in the drawing) displayed by expanding a project menu 23 in a state in which the object images 30A to 30D are arranged on the generation screen 20, the designer can perform a process of building a UI configured by the object images 30A to 30D.

C. Build Process

A UI build process performed by an information processing apparatus 300X according to a comparative example and a UI build process performed by the information processing apparatus 300 according to this embodiment will be described with reference to FIGS. 3 to 7.

Figure 3:
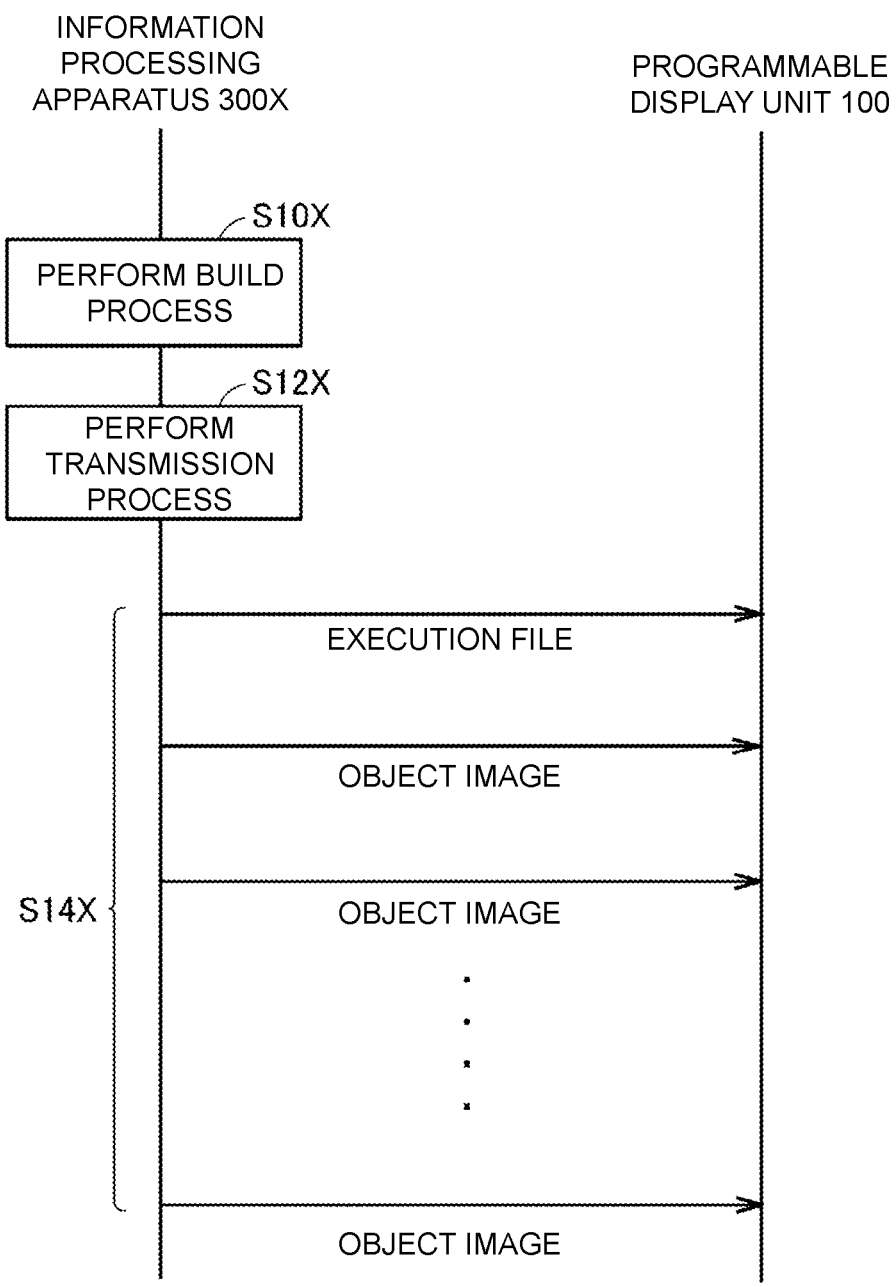
FIG. 3 is a diagram illustrating the data flow of a case where an output result of a build process performed by an information processing apparatus according to a comparative example is transmitted to a programmable display unit 100.
Figure 4:
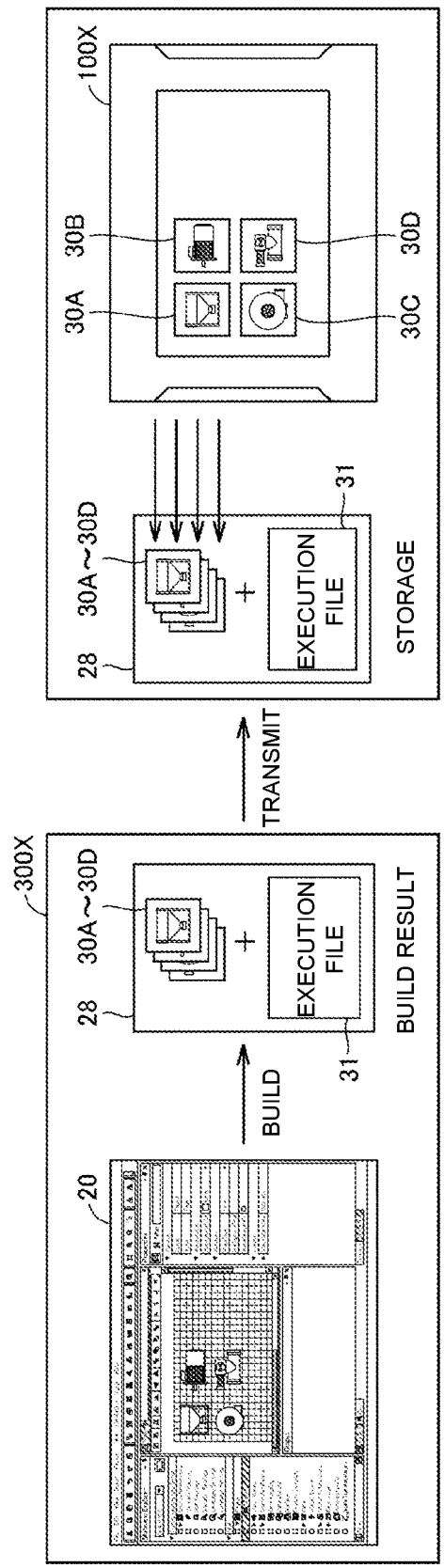
FIG. 4 is a conceptual diagram schematically illustrating the build process performed by the information processing apparatus according to the comparative example.

FIG. 3 is a diagram illustrating a data flow when an output result of a build process performed by the information processing apparatus 300X according to the comparative example is transmitted to the programmable display unit 100. FIG. 4 is a conceptual diagram schematically illustrating the build process performed by the information processing apparatus 300X according to the comparative example.

In Step S10X, the designer performs a build operation for the information processing apparatus 300X. The information processing apparatus 300X performs a UI build process on the basis of the reception of a build instruction. The information processing apparatus 300X outputs object images 30A to 30D arranged on a generation screen 20 and an execution file 31 of the UI as a build result 28. The execution file 31, for example, is an executable (EXE) file. In the execution file 31, coordinate values of the object images 30A to 30D on the UI and the like are defined.

In Step S12X, the designer performs an operation for transmitting a build result 28 to the programmable display unit 100. The information processing apparatus 300X establishes communication with the programmable display unit 100 on the basis of the reception of a transmission instruction of the build result 28 and starts transmission of the object images 30A to 30D and the execution file 31.

In Step S14X, the information processing apparatus 300X transmits the object images 30A to 30D and the execution file 31 to the programmable display unit 100. At this time, the information processing apparatus 300X sequentially transmits the object images 30A to 30D. For this reason, the number of times of communication between the information processing apparatus 300X and the programmable display unit 100 increases according to the number of object images present in the UI generation tool. Thus, the information processing apparatus 300 according to this embodiment decreases the number of times of communication required for the transmission of such object images.

Figure 5:
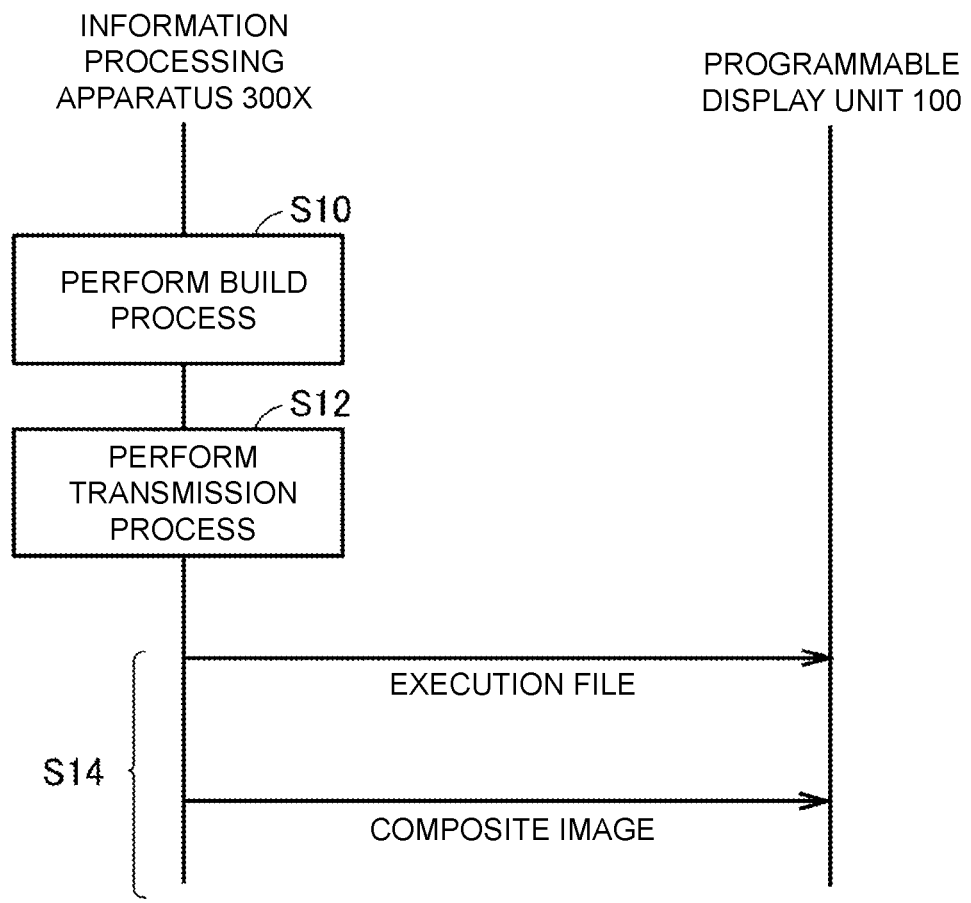
FIG. 5 is a conceptual diagram schematically illustrating a build process performed by an information processing apparatus according to a first embodiment.
Figure 6:
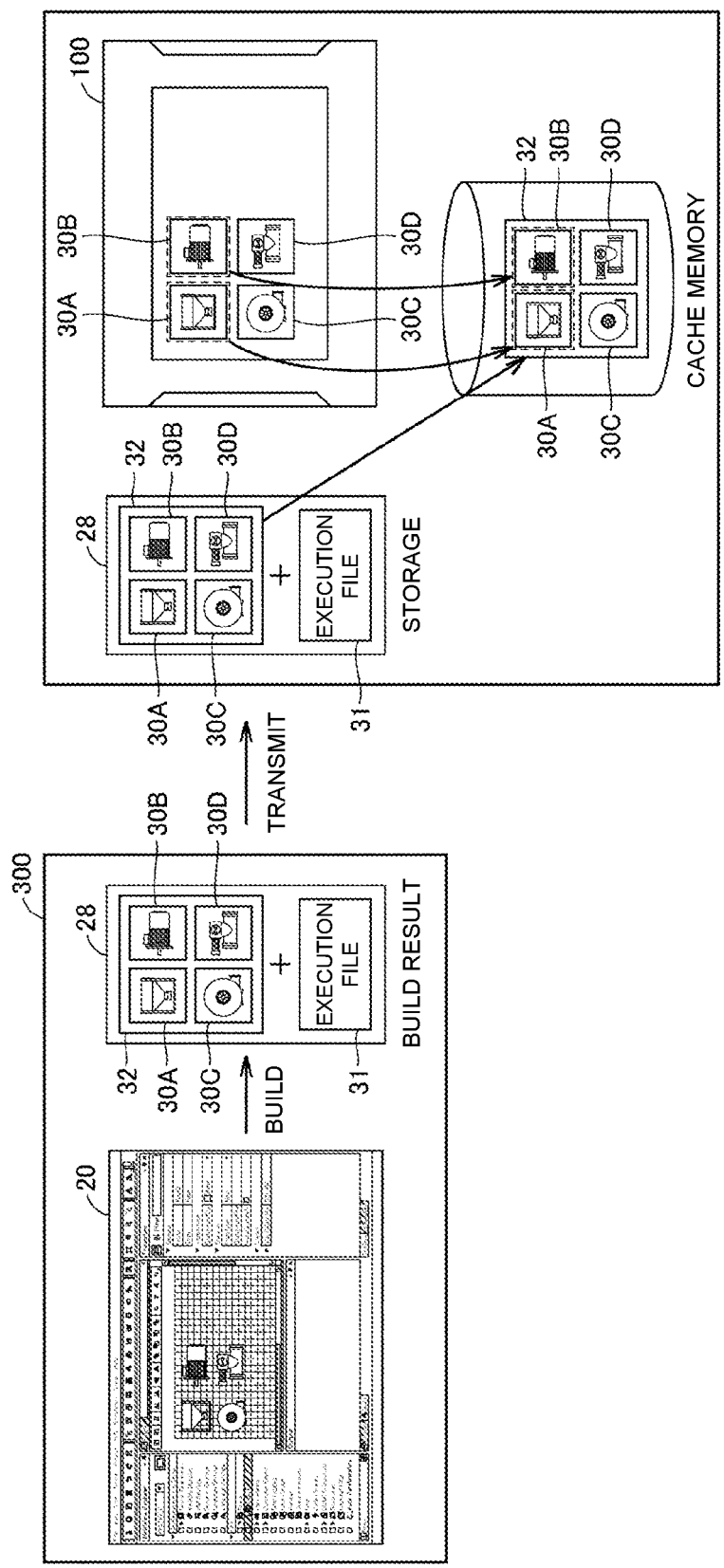
FIG. 6 is a diagram illustrating a data flow of a case where an output result of the build process performed by the information processing apparatus according to the first embodiment is transmitted to a programmable display unit.

FIG. 5 is a conceptual diagram schematically illustrating a build process performed by the information processing apparatus 300 according to this embodiment. FIG. 6 is a diagram illustrating a data flow when an output result of the build process performed by the information processing apparatus 300 according to this embodiment is transmitted to the programmable display unit 100.

In Step S10, the designer performs a build operation for the information processing apparatus 300. The information processing apparatus 300 performs a UI build process on the basis of the reception of a build instruction. In this embodiment, when a build instruction is received in a state in which two or more object images are arranged on the generation screen 20 of the UI, the information processing apparatus 300 generates a composite image including the two or more object images. At this time, the object images are aligned in order not to overlap each other on the composite image. In the example illustrated in FIG. 6, a composite image 32 in which the object images 30A to 30D are aligned is generated. At this time, the information processing apparatus 300 stores the coordinate values of the object images 30A to 30D of the composition sources inside the composite image 32 in coordinate information 324 illustrated in FIG. 7.

Figure 7:
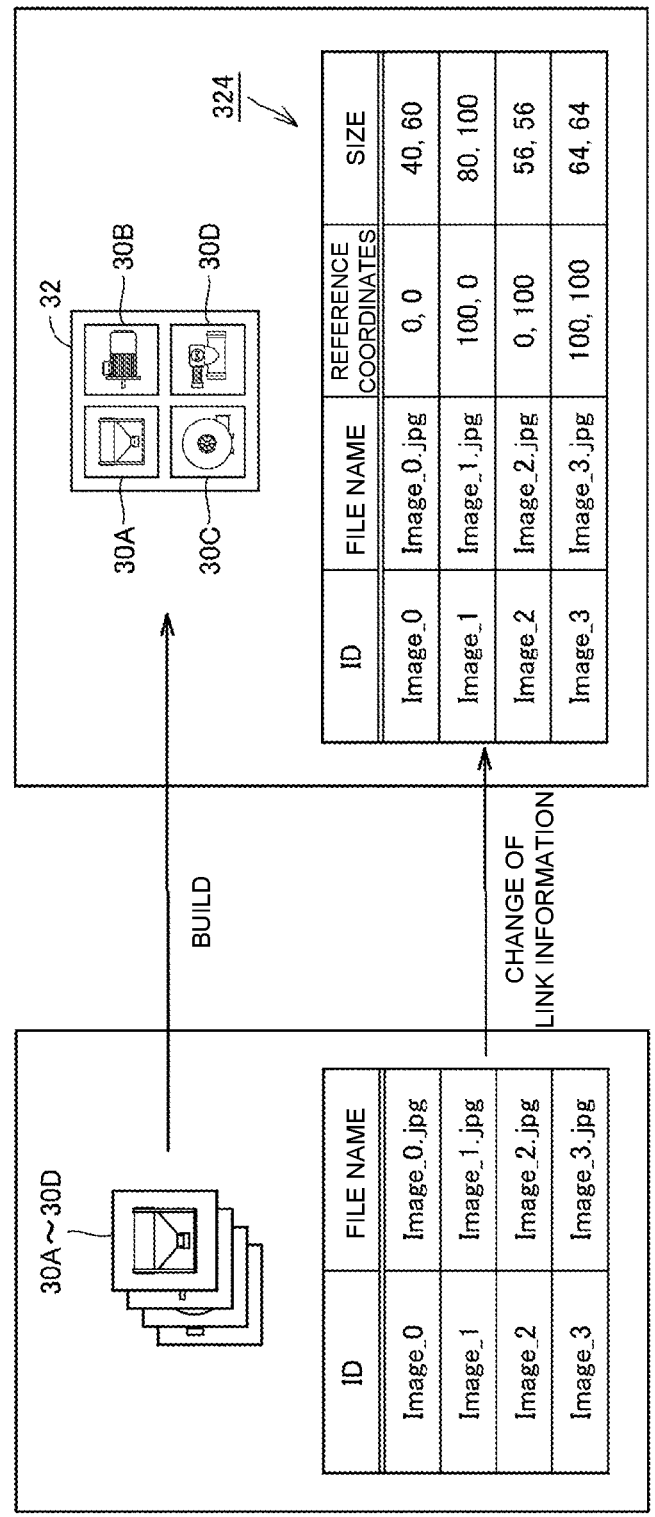
FIG. 7 is a diagram illustrating an example of the data structure of coordinate information according to the first embodiment.

FIG. 7 is a diagram illustrating an example of the data structure of the coordinate information 324. In the coordinate information 324, a file ID of each object image, a file name of each object image, and the coordinate values of each object image on the composite image 32 are associated with each other. The coordinate values, for example, are represented by reference coordinates on the composite image 32 and a size of each object image. The reference values, for example, represent an end point (for example, an upper left end) of each object image on the composite image 32, and the size of each object image is represented using a horizontal width and a height of each object image. The coordinate information 324 may be output in a state of being included in the execution file 31 or may be output separately from the execution file 31.

Referring to FIGS. 5 and 6 again, in Step S12, the designer performs an operation for transmitting the build result 28 to the programmable display unit 100. The information processing apparatus 300 establishes communication with the programmable display unit 100 on the basis of reception of a transmission instruction of the build result 28 and starts transmission of the execution file 31 and the composite image 32.

In Step S14, the information processing apparatus 300 transmits the execution file 31 and the composite image 32 to the programmable display unit 100. At this time, the information processing apparatus 300 transmits the composite image 32 including the object images 30A to 30D to the programmable display unit 100 through one instance of communication. For this reason, the number of times of communication can be decreased to be smaller than that of a case where the object images 30A to 30D are individually transmitted. As a result, the transmission time of the build result 28 is shortened.

D. UI Configuring Process

The programmable display unit 100 arranges object images on a UI on the basis of reception of an execution instruction (for example, a click operation) for the execution file 31 from a user, thereby configuring the UI. Hereinafter, referring back to FIGS. 4 and 6, the UI configuring process performed by the information processing apparatus 300X according to the comparative example and the UI configuring process performed by the information processing apparatus 300 according to this embodiment will be described.

As illustrated in FIG. 4, the programmable display unit 100X according to the comparative example writes object images 30A to 30D and an execution file 31 in a storage of the programmable display unit 100X on the basis of reception of an execution instruction of the execution file 31. At this time, since the programmable display unit 100X individually writes the object images 30A to 30D in the storage, the writing time becomes long.

Next, the programmable display unit 100X individually accesses the object images 30A to 30D written into the storage and writes the object images 30A to 30D into a cache memory of the programmable display unit 100X. At this time, the writing into the cache memory is realized by searching for files that are necessary for a file system of an operating system (OS) in the storage and reading the files from the storage. For this reason, as the number of object images is increased, a time required for searching for files increases, and the number of times of reading the files increases. Since the object images 30A to 30D are individually written into the cache memory, the writing time increases.

Next, the programmable display unit 100X individually accesses the object images 30A to 30D written into the cache memory and arranges each object image on the UI on the basis of the coordinate values of the object images 30A to 30D defined in the execution file 31, thereby configuring the UI.

In this way, in the programmable display unit 100X according to the comparative example, as the number of the object images is increased, a time required for searching for necessary files and the number of times of reading the necessary files in the storage increase. In addition, since the object images 30A to 30D are individually written into the storage or the cache memory, the time required for drawing the UI increases.

As illustrated in FIG. 6, the programmable display unit 100 according to this embodiment writes the execution file 31 and the composite image 32 in the storage of the programmable display unit 100 on the basis of reception of an execution instruction of the execution file 31. At this time, the number of times of writing the composite image 32 into the storage is one. For this reason, the writing time for the storage is shorter than that of the comparative example.

Next, the programmable display unit 100 accesses the composite image 32 written in the storage and writes the composite image 32 in the cache memory of the programmable display unit 100. At this time, the number of times of writing the composite image 32 in the cache memory is one. In addition, since a plurality of object images are gathered for the composite image 32, the time required for searching for necessary files and the number of times of reading the necessary files in the storage are smaller than those of the comparative example.

Next, the programmable display unit 100 cuts out the object images 30A to 30D of the composition sources from the composite image 32 on the basis of the coordinate information 324 (see FIG. 7) described above to acquire the object images 30A to 30D. Thereafter, the programmable display unit 100 arranges the object images 30A to 30D on a UI to configure the UI.

In this way, in the programmable display unit 100 according to this embodiment, the writing of the composite image 32 into the storage or the cache memory is performed once, and the time required for drawing the UI is shorter than that of the comparative example. Accordingly, the responsiveness for a user's display operation is improved. Particularly, at the time of the first display of the UI, the writing process for the storage or the cache memory is performed, and accordingly, a time required for the first drawing of the UI is shortened. In addition, a plurality of object images are gathered for a composite image, and accordingly, the number of files is decreased, and fragmentation of data is minimized.

E. Functional Configuration

Figure 8:
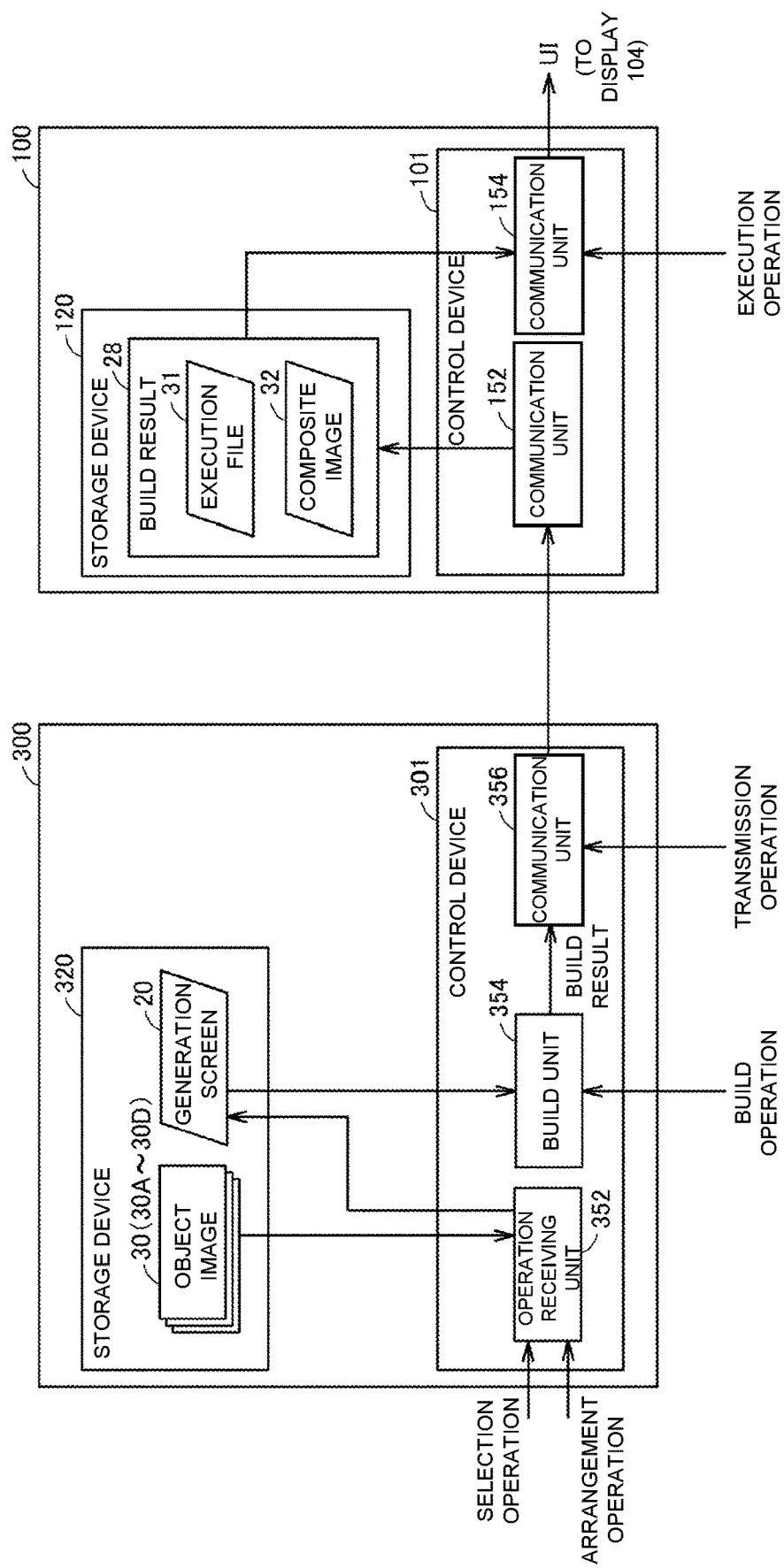
FIG. 8 is a diagram illustrating an example of the functional configuration of an information processing system according to the first embodiment.

The functional configuration of the information processing system 1 according to this embodiment will be described with reference to FIG. 8. FIG. 8 is a diagram illustrating an example of the functional configuration of the information processing system 1.

As illustrated in FIG. 8, the information processing system 1 includes a programmable display unit 100 and an information processing apparatus 300 as major apparatus configuration. The programmable display unit 100 includes a control device 101 and a storage device 120 as major hardware configuration. The control device 101 includes a communication unit 152 and a configuration unit 154 as an example of the functional configuration. The information processing apparatus 300 includes a control device 301 and a storage device 320 as major hardware configurations. The control device 301 includes an operation receiving unit 352, a build unit 354, and a communication unit 356 as an example of the functional configuration.

The operation receiving unit 352 receives a selection of an arbitrary object image from among a plurality of object images 30 serving as candidates for configuring the UI and receives an operation for arranging the selected object image 30 at an arbitrary position on the generation screen 20 of the UI. The selection operation and the arrangement operation for an object image 30 are, for example, realized by a mouse operation or a touch operation for the generation screen 20.

The build unit 354 outputs an execution file 31 used for configuring the UI including the object images 30 arranged on the generation screen 20 on the basis of reception of a UI build operation. At this time, when a build operation is received in a state in which two or more object images 30 are arranged on the generation screen 20, the build unit 354 generates a composite image 32 including the two or more object images 30 and further outputs the coordinate information 324 (see FIG. 7) of each of the object images 30 serving as composition sources inside the composite image 32 and the composite image 32. The composite image 32 and the coordinate information 324 may be output in a state of being included in the execution file 31 or be separately output from the execution file 31.

Here, the number of generated composite images 32 does not need to be one and may be two or more. When the data size of the composite image 32 is large, there is a possibility that the occupation rate of the memory cache increases, or the load for file access to the storage increases, and the performance may not be improved as was originally intentioned. Thus, in a case in which the data size of the composite image 32 is larger than a size set in advance, the build unit 354 may divide the composite image 32 such that the composite image 32 is smaller than the size set in advance.

The communication unit 356 controls the communication interface 305 (see FIG. 11) of the information processing apparatus 300, thereby realizing communication with the programmable display unit 100. The communication unit 356 transmits a build result output from the build unit 354 to the programmable display unit 100 through the communication interface 305 on the basis of reception of a transmission instruction from the user.

The communication unit 152 controls the communication interface 105 (see FIG. 11) of the programmable display unit 100, thereby realizing communication with the information processing apparatus 300. When the build result is received from the information processing apparatus 300 through the communication interface 105, the communication unit 152 stores the build result in the storage device 120.

In a case in which an execution operation of the execution file 31 is received, the configuration unit 154 cuts out object images serving as composition sources from the composite image 32 on the basis of the coordinate information 324 (see FIG. 7) described above. Thereafter, the configuration unit 154 arranges the object images of the composition sources on the UI on the basis of the coordinate information of each object image, which represents coordinates on the UI, defined in the execution file 31. The configured UI is displayed on a display 104 (see FIG. 11) of the programmable display unit 100 to be described later.

In addition, a part or all of the functional configuration of the information processing apparatus 300 illustrated in FIG. 8 may be mounted in the programmable display unit 100. For example, the operation receiving unit 352 and the build unit 354 may be mounted in the programmable display unit 100. In other words, a development program of a UI may be installed not in the information processing apparatus 300 but in the programmable display unit 100. In addition, a part or all of the functional configuration of the programmable display unit 100 illustrated in FIG. 8 may be mounted in the information processing apparatus 300. For example, the configuration unit 154 may be installed in the information processing apparatus 300.

F. Control Structure (F1. Flow of Build Process)

Figure 9:
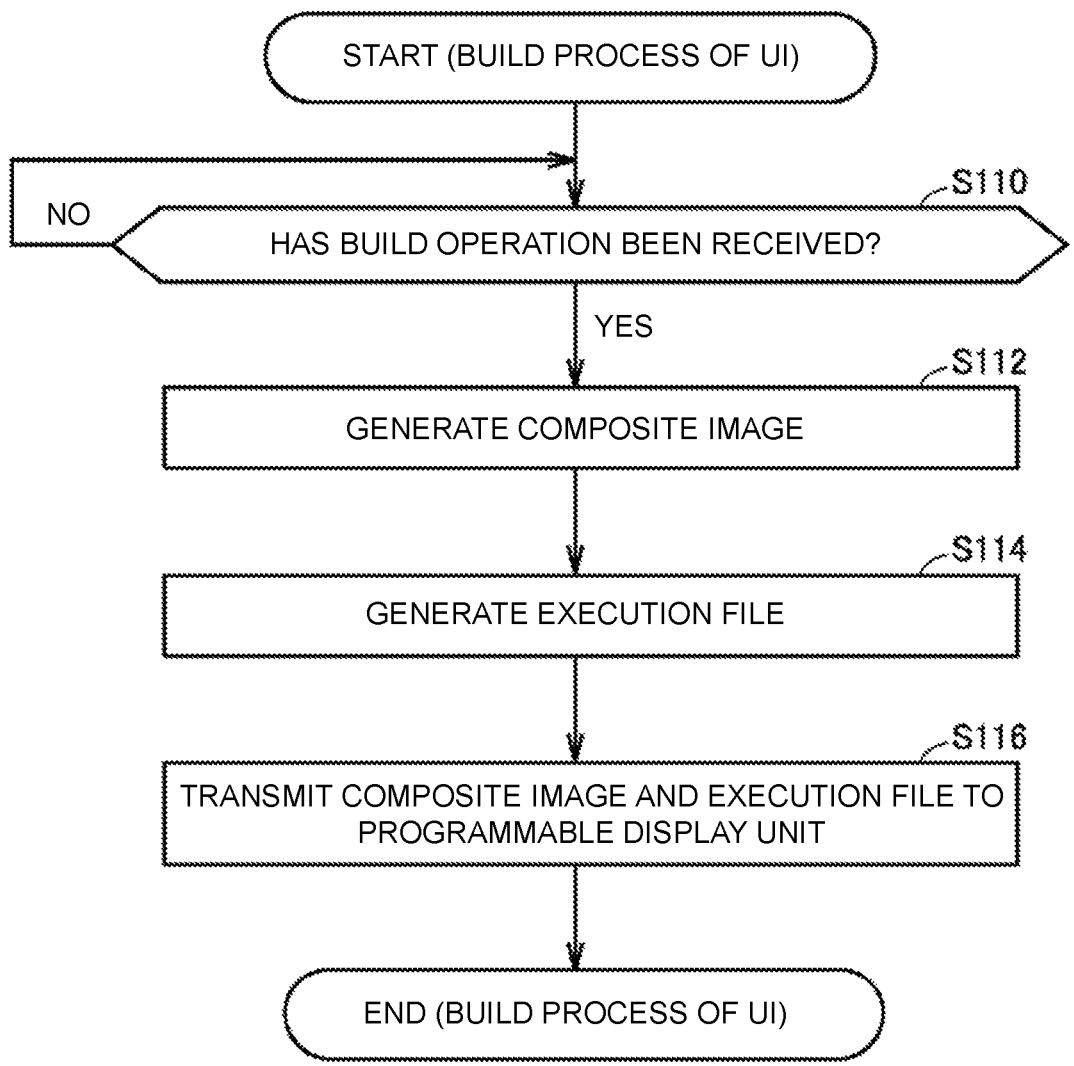
FIG. 9 is a flowchart illustrating the build process performed by the information processing apparatus according to the first embodiment.

The flow of the build process of a UI will be described with reference to FIG. 9. FIG. 9 is a flowchart illustrating the build process performed by the information processing apparatus 300. The process illustrated in FIG. 9 is realized by the control device 301 of the information processing apparatus 300 executing a program.

According to another aspect, a part or all of the process may be performed by the programmable display unit 100, a circuit element, or any other hardware.

In Step S110, the control device 301 determines whether or not a build operation of a UI has been received in the operation receiving unit 352 (see FIG. 8) described above. For example, the control device 301 may determine that a build operation of a UI has been received on the basis of detection of pressing of the build button on the generation screen 20 of the UI (see FIG. 2). When it is determined that a build operation of a UI has been received (Yes in Step S110), the control device 301 switches the control to Step S112. Otherwise (No in Step S110), the control device 301 re-performs the process of Step S110.

In Step S112, the control device 301 generates a composite image 32 (see FIG. 6) in which object images arranged on the generation screen 20 of the UI are aligned as the build unit 354 (see FIG. 8) described above. At this time, the control device 301 writes the coordinate values of each object image inside the composite image 32 into the coordinate information 324 (see FIG. 7) described above.

In Step S114, the control device 301 generates an execution file 31 (see FIG. 6) used for configuring a UI as the build unit 354 described above. At this time, the control device 301 writes the coordinate values of each object image on the UI into the execution file 31 on the basis of the arrangement positions of the object images arranged in the generation screen 20 of the UI.

In Step S116, the control device 301, as the communication unit 356 (see FIG. 8), transmits the composite image 32 and the coordinate information 324 generated in Step S112 and the execution file 31 generated in Step S114 to the programmable display unit 100 on the basis of reception of a transmission instruction for a build result described above. At this time, the composite image 32 and the coordinate information 324 may be transmitted together in a state of being written in the execution file 31 or be transmitted separately from the execution file 31.

(F2. Flow of UI Configuring Process)

Figure 10:
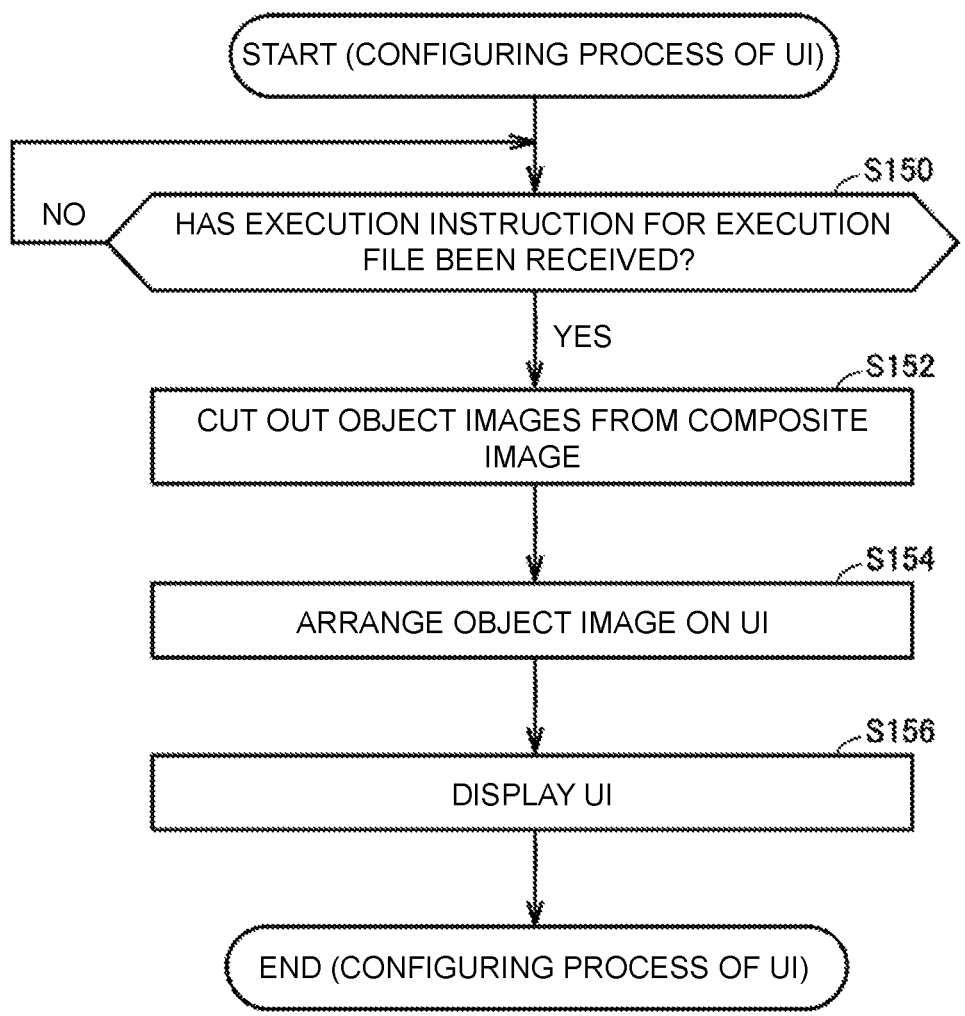
FIG. 10 is a flowchart illustrating a UI configuring process performed by a programmable display unit according to the first embodiment.

A flowchart of the UI configuring process performed by the programmable display unit 100 will be described with reference to FIG. 10. FIG. 10 is a flowchart illustrating the UI configuring process performed by the programmable display unit 100. The process illustrated in FIG. 10 is realized by the control device 301 of the programmable display unit 100 executing a program. According to another aspect, a part or all of the process may be performed by the information processing apparatus 300, a circuit element, or any other hardware.

In Step S150, the control device 101, as the configuration unit 154 (see FIG. 8), determines whether or not an execution instruction for the execution file 31 has been received from the information processing apparatus 300. When it is determined that an execution instruction for the execution file 31 has been received from the information processing apparatus 300 (Yes in Step S150), the control device 101 switches the control to Step S152. Otherwise (No in Step S150), the control device 101 re-performs the process of Step S150.

In Step S152, the control device 101 cuts out each object image from the composite image 32 received from the information processing apparatus 300 on the basis of the coordinate information 324 (see FIG. 7) as the configuration unit 154 described above.

In Step S154, the control device 101 arranges each object image acquired in Step S152 on the UI on the basis of the coordinate values of each object image on the UI that is defined in the execution file 31 as the configuration unit 154 described above.

In Step S156, the control device 101 displays the UI configured in Step S154 on the display 104 (see FIG. 11) of the programmable display unit 100.

G. Hardware Configuration of Information Processing System 1

Figure 11:
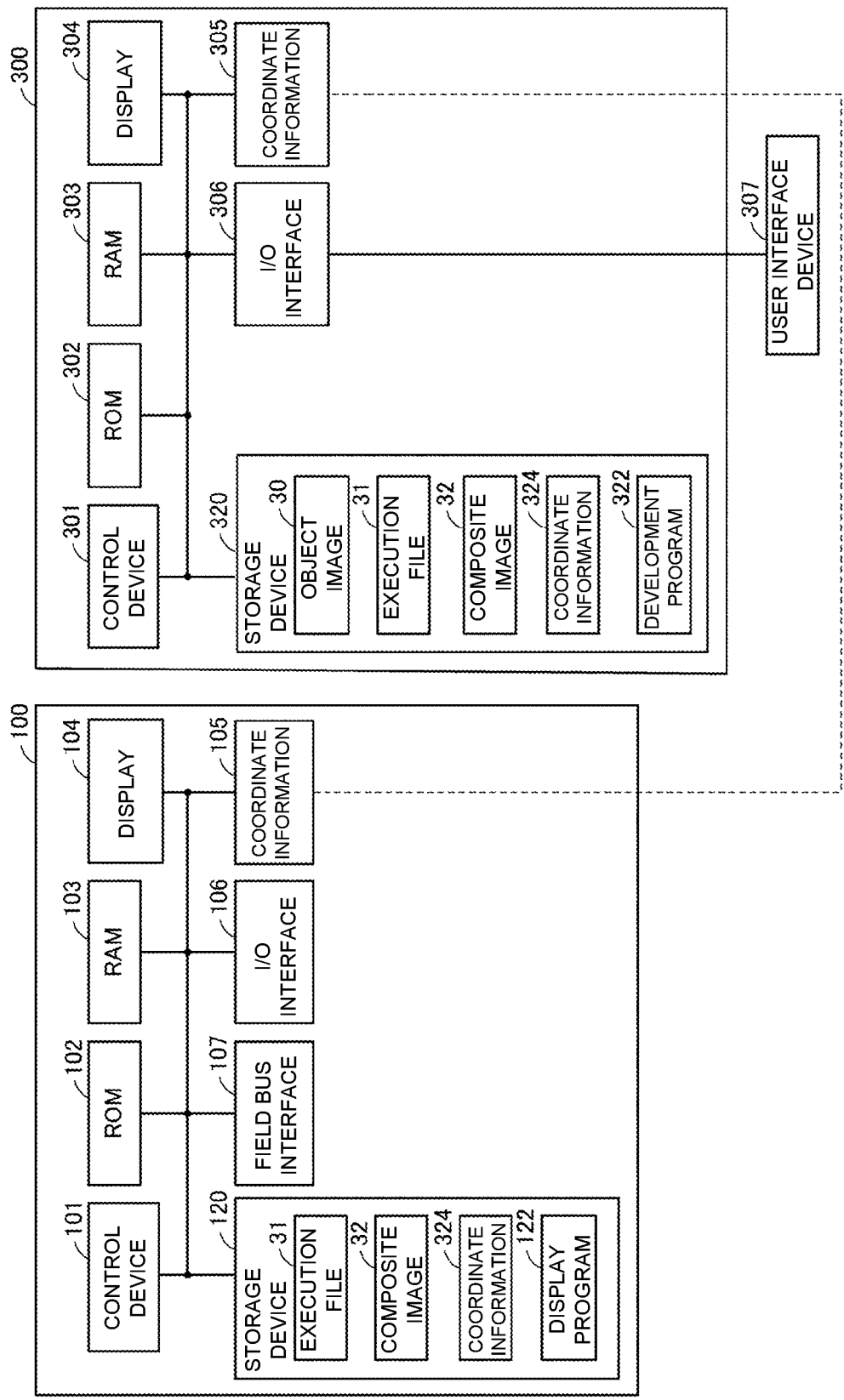
FIG. 11 is a block diagram illustrating the major hardware configuration of the information processing system according to the first embodiment.

An example of the hardware configuration of the information processing system 1 will be described with reference to FIG. 11. FIG. 11 is a block diagram illustrating the major hardware configuration of the information processing system 1.

As illustrated in FIG. 11, the information processing system 1 is configured by a programmable display unit 100 and an information processing apparatus 300. The programmable display unit 100 and the information processing apparatus 300 are interconnected through a network. Hereinafter, the hardware configurations of the programmable display unit 100 and the information processing apparatus 300 will be sequentially described.

(G1. Hardware Configuration of Programmable Display Unit 100)

As illustrated in FIG. 11, the programmable display unit 100 includes a control device 101, a read only memory (ROM) 102, a random access memory (RAM) 103, a display 104, a communication interface 105, an I/O interface 106, a field bus interface 107, and a storage device 120.

The control device 101 controls the programmable display unit 100. The control device 101, for example, is configured by at least one integrated circuit. The integrated circuit, for example, is configured by at least one central processing unit (CPU), at least one application specific integrated circuit (ASIC), at least one field programmable gate array (FPGA), a combination thereof, or the like.

The control device 101 controls the operation of the programmable display unit 100 by executing various programs such as a display program 122 of the UI and the like. The control device 101 reads the display program 122 into the ROM 102 from the storage device 120 on the basis of reception of an execution command for the display program 122. The RAM 103 functions as a work memory and temporarily stores various kinds of data that is necessary for the execution of the display program 122.

The display 104 is, for example, a liquid crystal display, an organic electroluminescence (EL) display, or any other display device. The display 104 is superimposed on a touch panel and receives various operations for the programmable display unit 100 through touch operations. The display 104 displays a generated UI on the basis of reception of an execution instruction for the execution file 31.

The communication interface 105, the I/O interface 106, and the field bus interface 107 mediate the exchange of data between the programmable display unit 100 and an external apparatus. More specifically, the communication interface 105 mediates communication with the information processing apparatus 300 through the network 8 (see FIG. 1) or the like. As the communication interface 105, for example, a component capable of performing communication according to Ethernet may be employed. The I/O interface 106 mediates communication with various user interface devices 307 (for example, a keyboard, a mouse, and the like). As the I/O interface 106, for example, a component capable of performing USB communication or serial communication may be employed. The field bus interface 107 mediates exchange of data with the controller 200. As the field bus interface 107, a component capable of performing communication according to EtherCAT (registered trademark) or, similar to the communication interface 105, a component capable of performing communication according to Ethernet may be employed.

The storage device 120, for example, is a recording medium such as a flash memory. For example, the storage device 120 stores a build result (the execution file, 31, the composite image 32, and the coordinate information 324 described above) of the UI acquired using the information processing apparatus 300, the display program 122 of the UI, and the like. The storage place of the build result and the display program 122 is not limited to the storage device 120, and the build result and the display program 122 may be stored in a storage area (for example, a cache memory or the like) of the control device 101, the ROM 102, the RAM 103, an external apparatus (for example, the information processing apparatus 300 or a server), or the like.

In addition, the display program 122 of the UI may be provided not as a single program but built into a part of an arbitrary program. In such a case, the process according to this embodiment is realized in cooperation with an arbitrary program. A program not including such a part of a module does not depart from the purpose of the display program 122 according to this embodiment. In addition, a part or all of the function provided by the display program 122 may be realized by dedicated hardware. Furthermore, the programmable display unit 100 and the information processing apparatus 300 may be configured to execute the display program 122 in cooperation with each other. Furthermore, the programmable display unit 100 may be configured in a form in which at least one server executes a part of the process of the display program 122 that is a so-called cloud service.

(G2. Hardware Configuration of Information Processing Apparatus 300)

Subsequently, the hardware configuration of the information processing apparatus 300 will be described with reference to FIG. 11.

The information processing apparatus 300 includes a control device 301, a ROM 302, a RAM 303, a display 304, a communication interface 305, an I/O interface 306, and a storage device 320.

The control device 301 controls the information processing apparatus 300. The control device 301, for example, is configured by at least one integrated circuit. The integrated circuit, for example, is configured by at least one CPU, at least one ASIC, or at least one FPGA, a combination thereof, or the like.

The control device 301 executes various programs such as a development program 322 of the UI and the like, thereby controlling the information processing apparatus 300. The control device 301 reads the development program 322 into the ROM 302 from the storage device 320 on the basis of reception of an execution command of the development program 322 of the UI. The RAM 303 functions as a work memory and temporarily stores various kinds of data that is necessary for the execution of the development program 322.

The display 304 is, for example, a liquid crystal display, an organic EL display, or any other display device. The display 304 is superimposed on a touch panel and receives various operations for the information processing apparatus 300 through touch operations. The display 304 displays the generation screen 20 (see FIG. 2) displayed on the basis of the execution of the development program 322 and the like.

The communication interface 305 and the I/O interface 306 mediate exchange of data between the information processing apparatus 300 and an external apparatus. More specifically, the communication interface 305 mediates communication with the information processing apparatus 300 through the network 10 (see FIG. 1) or the like. As the communication interface 305, for example, a component capable of performing communication according to Ethernet may be employed. The I/O interface 306 mediates communication with various user interface devices (for example, a keyboard, a mouse, and the like). As the I/O interface 306, for example, a component capable of performing USB communication or serial communication may be employed.

The storage device 320 is, for example, a storage medium such as a hard disk or a flash memory. For example, the storage device 320 stores object images 30 serving as candidates for configuring the UI, a build result (the execution file 31, the composite image 32, and the coordinate information 324 described above) of the UI, the development program 322 of the UI, and the like. The storage place of the object images 30, the build result of the UI, and the development program is not limited to the storage device 320, and the object images 30, the build result of the UI, and the development program 322 may be stored in a storage area (for example, a cache memory or the like) of the control device 301, the ROM 302, the RAM 303, an external apparatus (for example, the programmable display unit 100 or a server), or the like.

In addition, the development program 322 of the UI may be provided not as a single program but built into a part of an arbitrary program. In such a case, the process according to this embodiment is realized in cooperation with an arbitrary program. A program not including such a part of a module does not depart from the purpose of the development program 322 according to this embodiment. In addition, a part or all of the function provided by the development program 322 may be realized by dedicated hardware. Furthermore, the programmable display unit 100 and the information processing apparatus 300 may be configured to execute the development program 322 in cooperation with each other. Furthermore, the information processing apparatus 300 may be configured in a form in which at least one server executes a part of the process of the development program 322 that is a so-called cloud service.

H. Summary of First Embodiment

As above, when a build instruction is received in a state in which two or more object images are arranged on the generation screen of the UI, the information processing apparatus 300 according to this embodiment generates a composite image including the object images. The generated composite image is transmitted to the programmable display unit 100 together with an execution file. Due to transmitting the composite image to the programmable display unit 100, the number of times of communication is smaller than that of a case where the object images are individually transmitted to the programmable display unit 100. As a result, the transmission time of the build result is shortened.

The programmable display unit 100 writes the composite image into the cache memory on the basis of reception of an execution instruction of the execution file received from the information processing apparatus 300. Thereafter, the programmable display unit 100 cuts out each object image from the composite image on the basis of the coordinate information 324 described above defining the coordinate values of the object image included inside the composite image. In this way, since the number of times of writing the composite image into the cache memory is one, the writing time is shorter than that of a case where the object images are individually written into the cache memory. In addition, since a plurality of object images are gathered for the composite image, a time required for searching for necessary files in the storage and the number of times of reading the necessary files are decreased. As a result, a time required for configuring the UI can be shortened, and accordingly, a time required for drawing the UI is shortened.

Particularly, in the field of FA, in order to also secure quality for produced products, an operation mistake for the programmable display unit 100 is not allowed. At this time, when the time required for drawing the UI is long, there is a possibility that an operation mistake may occur due to an operation of the UI during the drawing or the like. However, since the programmable display unit 100 according to this embodiment can shorten the time required for drawing the UI, occurrences of such operational mistakes can be minimized.

Second Embodiment

Figure 12:
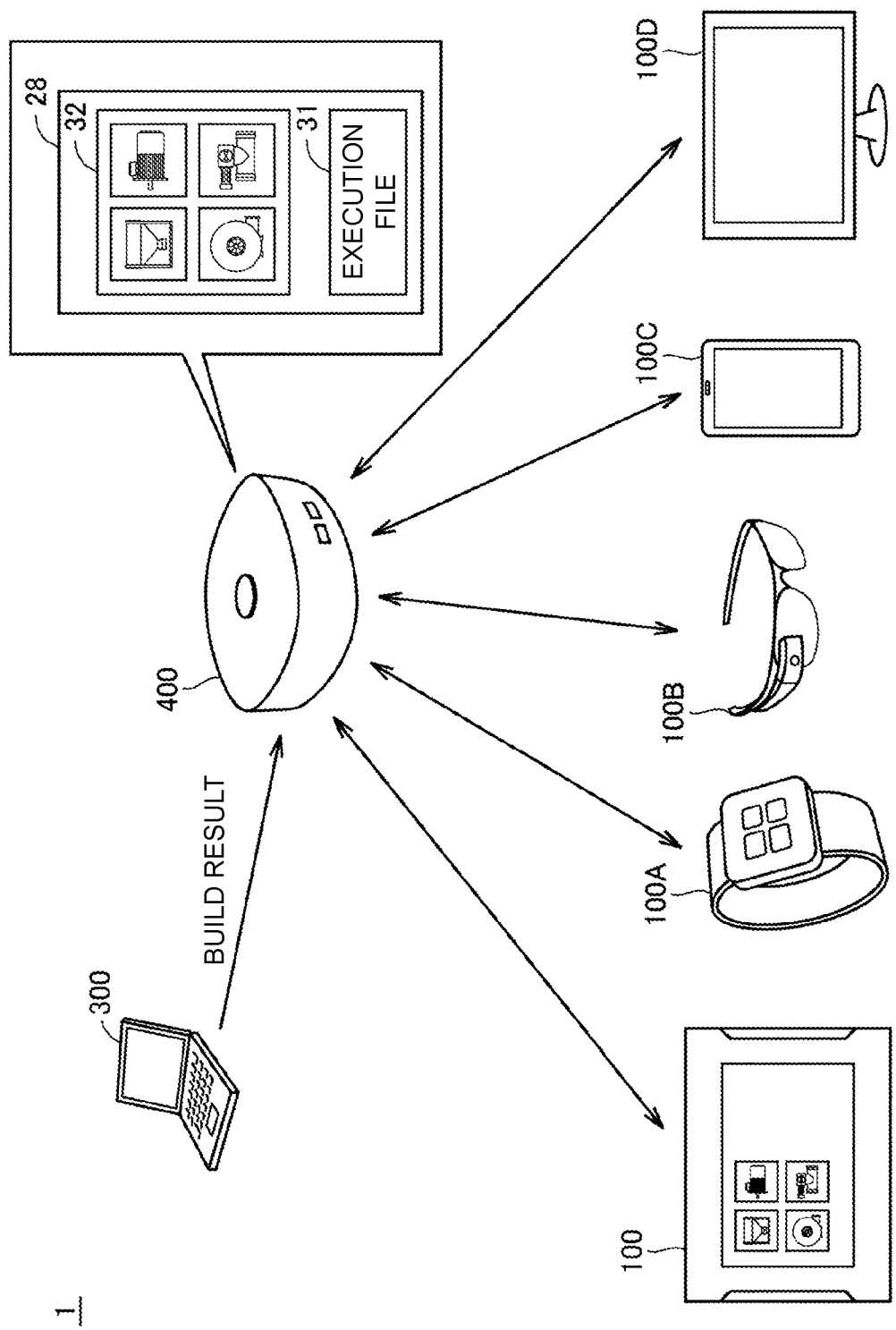
FIG. 12 is a diagram illustrating an example of the apparatus configuration of an information processing system according to a second embodiment.

An information processing system 1 according to a second embodiment will be described with reference to FIG. 12. FIG. 12 is a diagram illustrating an example of the apparatus configuration of the information processing system 1.

In the first embodiment, a build result 28 output by the information processing apparatus 300 is stored in the programmable display unit 100. In contrast to this, in the second embodiment, a build result 28 output by the information processing apparatus 300 is stored on a server 400. The other points are the same as those of the information processing system 1 according to the first embodiment, and, hereinafter, description thereof will not be repeated.

When a display operation of a UI is received, the programmable display unit 100 transmits a UI acquisition request to the server 400. When the UI acquisition request is received from the programmable display unit 100, the server 400 performs the UI configuring process described above (see FIG. 10). The server 400 transmits the UI acquired according to the configuring process to the programmable display unit 100. When the UI is received from the server 400, the programmable display unit 100 displays the UI on a display 104 (see FIG. 11).

Here, an information processing terminal transmitting a UI acquisition request is not limited to the programmable display unit 100. For example, the information processing terminal transmitting a UI acquisition request may be a wearable terminal 100A of a watch type, a wearable terminal 100B of a glasses type, a mobile terminal 100C such as a smartphone or a tablet terminal, or a web browser 100D.

In this way, by storing the build result 28 in the server 400, a designer can manage the build result 28 in a unified manner. As a result, at the time of updating the UI, the designer may rewrite only the build result 28 stored in the server 400, and accordingly, the UI can be easily updated.

Third Embodiment

A. Overview

The information processing apparatus 300 according to the first embodiment generates a composite image by using all the object images arranged on the generation screen 20 (see FIG. 2) of the UI in a build process. However, among the object images included in the composite image, there are object images having a low likelihood of being used by a user. When a composite image is generated in a state in which such an object image is included, the time taken for writing the composite image into the cache memory or the storage in the UI configuring process is unnecessary.

Thus, an information processing apparatus 300 according to the third embodiment, in a build process, specifies object images having a high likelihood of being used by the user among object images arranged on the generation screen 20 of the UI and generates a composite image using the object images. Accordingly, the time required for writing the composite image into the cache memory or the storage is further shortened in the UI configuring process.

The other points are the same as those of the information processing apparatus 300 according to the first embodiment, and, hereinafter, description thereof will not be repeated.

B. Build Process

Figure 13:
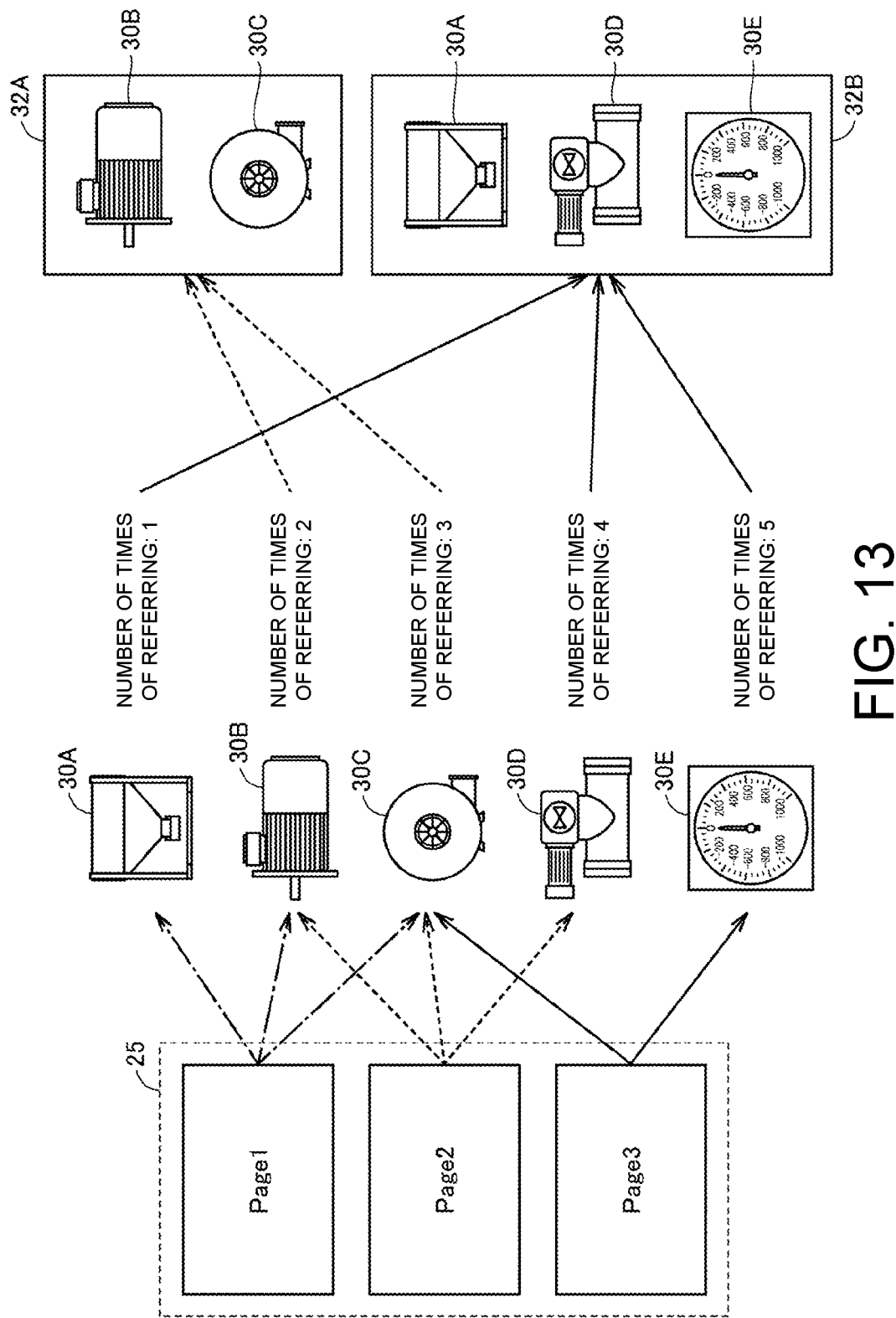
FIG. 13 is a conceptual diagram schematically illustrating a UI build process performed by an information processing apparatus according to a third embodiment.

A build process of a UI performed by the information processing apparatus 300 according to this embodiment will be described with reference to FIG. 13. FIG. 13 is a conceptual diagram schematically illustrating a build process of a UI performed by the information processing apparatus 300 according to this embodiment.

As described above, a developer can select arbitrary object images among a plurality of object images serving as candidates for configuring the UI and arrange the selected object images at arbitrary positions on the generation screen 20 (see FIG. 2) of the UI. At this time, the developer can arrange a same object image at different positions or different pages on the generation screen 20. In other words, the same object image can be referred to on the generation screen 20 a plurality of times. An object image having a large number of times of being referred to has a high likelihood of being used by a user. Thus, a build unit 354 (see FIG. 8) of the information processing apparatus 300 specifies a plurality of object images of which the numbers of times of being referred to are relatively high inside the generation screen 20 among object images arranged on the generation screen 20 and generates a composite image from the plurality of object images.

In FIG. 13, a UI 25 configured by a plurality of pages (three pages) is illustrated. A designer can arrange object images at arbitrary positions of each page on the generation screen 20 of the UI. In the example illustrated in FIG. 13, object images 30A to 30C are arranged on page "1". In addition, object images 30B to 30D are arranged on page "2". Furthermore, object images 30C and 30E are arranged on page "3". In other words, the number of times of being referred to of the object image 30A on the generation screen 20 is one. The number of times of being referred to of the object image 30B on the generation screen 20 is two. The number of times of being referred to of the object image 30C on the generation screen 20 is three. The number of times of being referred to of the object image 30D on the generation screen 20 is one. The number of times of being referred to of the object image 30E on the generation screen 20 is one.

The information processing apparatus 300 selects object images of which the numbers of times of being referred to among the object images 30A to 32E arranged on the generation screen 20 are relatively large. As a method for selecting object images at this time, an arbitrary method is employed. For example, object images of which the numbers of times of being referred to are more than a predetermined value may be selected. Alternatively, a predetermined number of high-ranked object images of which the numbers of times of being referred to are large may be selected. In the example illustrated in FIG. 13, the objects images 30B and 30C of which the numbers of times of being referred to are two or more are selected. The information processing apparatus 300 generates a composite image 32A from the objects images 30B and 30C of which the number of times of being referred to are relatively large. In addition, the information processing apparatus 300 generates a composite image 32B from the remaining object images 30A, 30D, and 32E. In this way, a composite image 32A having high likelihoods of being used by a user and a composite image 32B having likelihoods of being used by a user which are lower than those of the composite image 32A are generated.

C. Summary of Third Embodiment

As above, the information processing apparatus 300 according to this embodiment specifies object images of which the numbers of times of being referred to inside the generation screen 20 are relatively large among object images arranged on the generation screen 20 and generates a composite image from a plurality of these object images. In this way, by generating a composite image by using certain object images having a high likelihood of being used by a user, the data size of the composite image can be decreased, and an increase in the proportion of the cache memory occupied according to the composite image can be minimized in the information processing apparatus 300. In addition, the information processing apparatus 300 can prevent an object image having a low frequency of use from being written into the cache memory. In this way, the use efficiency of the cache memory is improved, and a time required for drawing the UI is shortened.

Fourth Embodiment

A. Overview

In the third embodiment described above, a composite image is generated from object images of which the numbers of times of being referred to in the generation screen 20 (see FIG. 2) of the UI are relatively large. In contrast to this, in a fourth embodiment, a composite image is generated from object images of which the use frequencies in the past are high. Accordingly, since objects images having high possibilities of being used by the user can be expanded in the cache memory or the storage, the use efficiency of the memory is improved.

The other points are the same as those of the information processing apparatuses 300 according to the first to third embodiments, and, hereinafter, description thereof will not be presented.

B. Optimization Process

Figure 14:
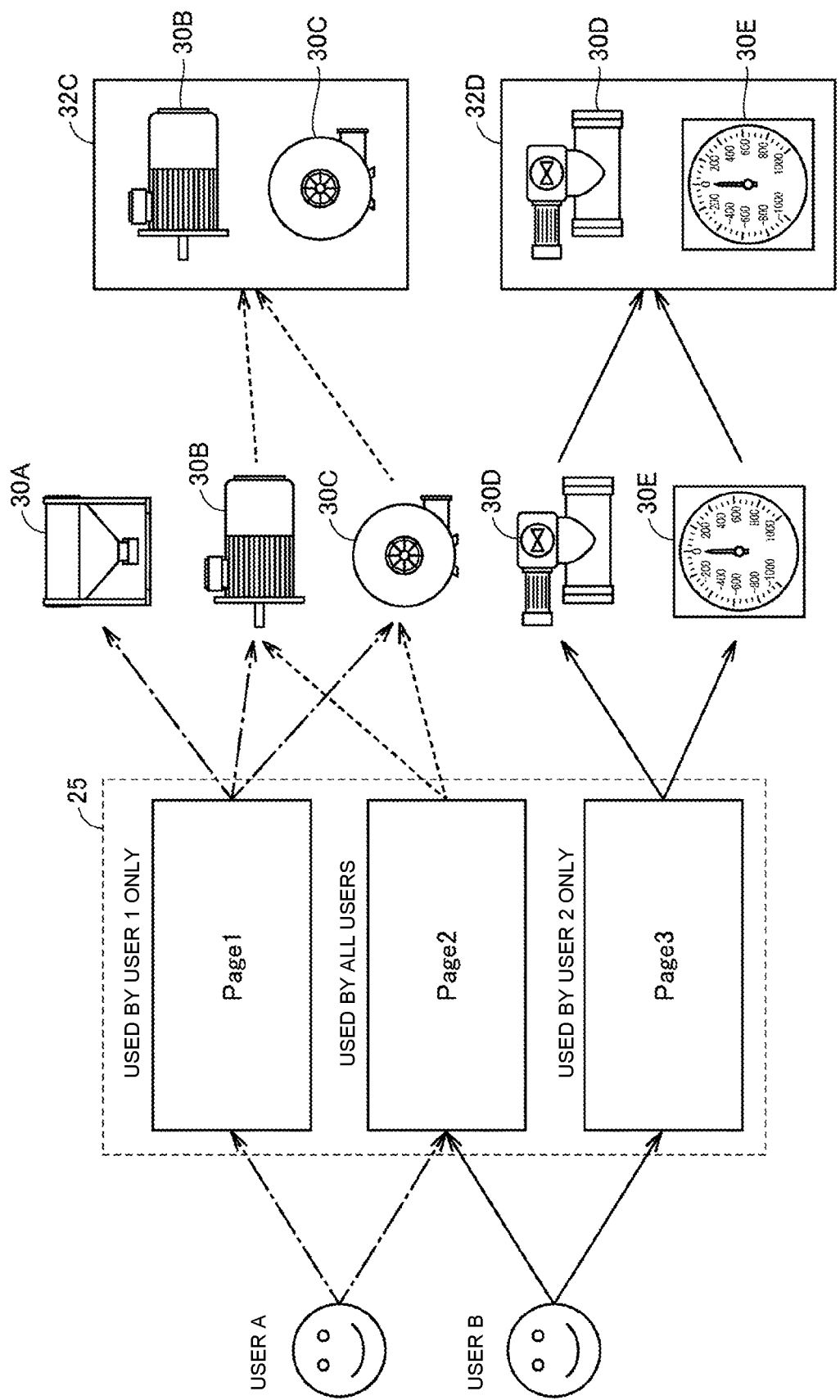
FIG. 14 is a conceptual diagram schematically illustrating an optimization process of a programmable display unit according to a fourth embodiment.

An optimization process for a composite image that is performed by a programmable display unit 100 according to this embodiment will be described with reference to FIGS. 14 and 15. FIG. 14 is a conceptual diagram schematically illustrating an optimization process of the programmable display unit 100 according to this embodiment.

In FIG. 14, a UI 25 configured by a plurality of pages (three pages) is illustrated. In the example illustrated in FIG. 14, page "1" includes object images 30A to 30C. In addition, page "2" includes object images 30B and 30C. Furthermore, page "3" includes object images 30D and 32E.

The programmable display unit 100 monitors the use status of object images on a UI 25. More specifically, the programmable display unit 100 monitors the use status of the UI displayed thereon for each user and writes the number of times of using an object image on the UI into the history information 124 illustrated in FIG. 15. FIG. 15 is a diagram illustrating an example of the data structure of the history information 124.

The history information 124, for example, is stored in a storage device 120 (see FIG. 11) of the programmable display unit 100. In the history information 124, the use status for each object image included in each page of the UI 25 is defined for each user. The use status of an object image, for example is represented using the number of times of use that represents the number of times of clicking on the object image, the number of times of displaying a page, or the like. Alternatively, the use status of an object image may be represented as the frequencies of use of the object image within a predetermined period.

When an execution instruction for the optimization process of a composite image is received, the programmable display unit 100 specifies the use status of each object image on the UI 25 for each user by referring to the use status of each object image defined in the history information 124. In the example illustrated in FIG. 14, a user "A" has used a page "1" including object images 30A to 30C and a page "2" including the object images 30B and 30C in the past. A user "B" has used the page "2" including the object images 30B and 30C and a page "3" including object images 30D and 32E in the past. In other words, the page "2" has been used by both the users "A" and "B". For example, the likelihood of the use of the object images 30B and 30C included in the page "2" is higher than that of any other object image.

When the object images 30B and 30C having user's high use frequencies among the object images 30A to 30D are specified, the programmable display unit 100 generates a composite image again from the object images 30B and 30C. As a result, the composite image 32C is newly generated. In this way, by optimizing object images used for generating a composite image, object images having high user's use frequencies can be included in the composite image. As a result, object images having high possibilities of being used by the user can be expanded in the cache memory or the storage, whereby the use efficiency of the memory is improved.

The programmable display unit 100 generates a composite image 32D from the remaining object images 30D and 32E. The object image 30A having a low frequency of use is not used for the composition but is maintained as a single object.

In this way, the optimization is realized according to the use form of each user. As a result, the operability is improved for each user. This effect is particularly significant for an apparatus (for example, the programmable display unit 100) having a high likelihood of being used by a plurality of users.

The generated composite images 32C and 32D are written into the cache memory of the programmable display unit 100 before the UI configuring process is performed. A timing at which the composite images 32C and 32D are written into the cache memory may be changed according to a user using the programmable display unit 100. For identifying a user, an existing technology is applied. For example, a user may be identified using user information of users logging into the programmable display unit 100. Alternatively, identifying a user may be realized using a face authentication technology.

For example, the composite image 32C used by all the users (the users "A" and "B") may be written into the cache memory immediately after the start of the operation of the programmable display unit 100. On the other hand, the composite image 32D used by only the user "B" may be written into the cache memory at a timing at which the user "B" logs into the programmable display unit 100.

C. Functional Configuration

A functional configuration for realizing the optimization process described above will be described with reference to FIGS. 16A to 16D. FIGS. 16A to 16D are diagrams illustrating examples of the functional configuration for realizing the optimization process of composite images.

Figure 16A:
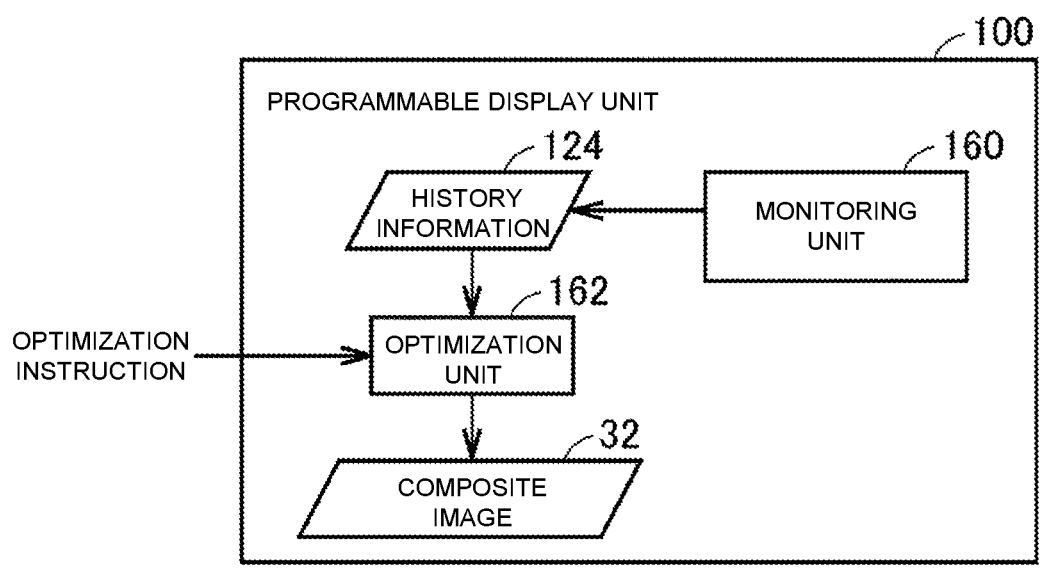
FIGS. 16A to 16D are diagrams illustrating examples of a functional configuration for realizing an optimization process of composite images according to the fourth embodiment.

As illustrated in FIG. 16A, the programmable display unit 100 includes a monitoring unit 160 and an optimization unit 162.

The monitoring unit 160 starts monitoring of a user operation for the UI on the basis of the execution of the execution file 31 described above and writes the use statuses of object images on the UI into the history information 124 described above. For example, when an operation (for example, a clicking operation or the like) for an object image on the UI is detected, the monitoring unit 160 increases the number of times of using the object image in the history information 124. Alternatively, when a certain page on the UI is displayed, the monitoring unit 160 increases the numbers of times of using object images included in the page in the history information 124.

The optimization unit 162 performs the optimization process described above on the basis of reception of an optimization instruction. More specifically, the optimization unit 162 specifies object images of which user's use frequencies are high on the basis of the use statuses of the object images defined in the history information 124 and generates a composite image 32 again from a plurality of object images. The optimization instruction may be issued on the basis of a predetermined user operation or be issued at intervals (for example, one month) set in advance.

In addition, the composite image 32, the history information 124, the monitoring unit 160, and the optimization unit 162 do not necessarily need to be mounted in the programmable display unit 100 and may be mounted in any other apparatus.

Figure 16B:
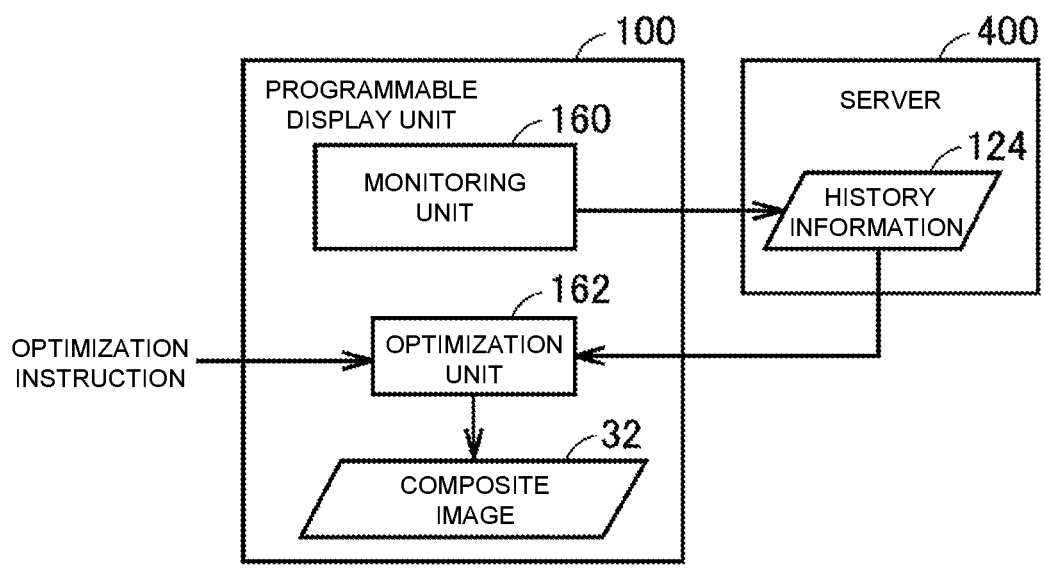

For example, as illustrated in FIG. 16B, the history information 124 may be stored in the server 400. In such a case, the server 400 can collect the use statuses of object images on the UI from a plurality of programmable display units 100 with which communication is possible. The optimization unit 162 performs an optimization process at the time of starting the operation of the programmable display unit 100 or at a timing at which an execution button for the optimization process that is present in a system menu is pressed.

Figure 16C:
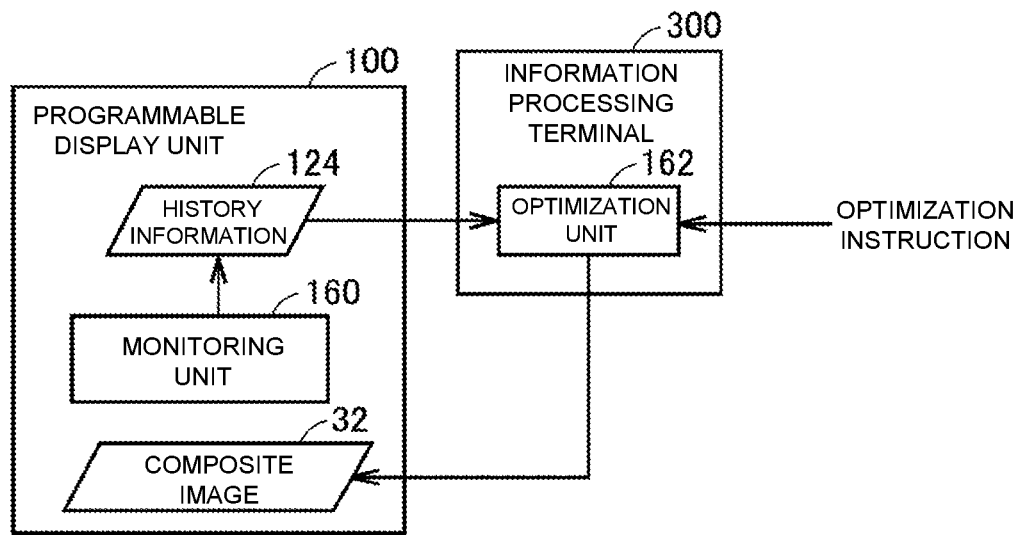

As another example, as illustrated in FIG. 16C, the optimization unit 162 may be mounted in the information processing apparatus 300. In such a case, the optimization unit 162 is mounted as one function of the UI developing tool installed in the information processing apparatus 300. The optimization unit 162 reads the history information 124 from the programmable display unit 100 at a timing at which a build operation is received by the UI developing tool and performs an optimization process.

Figure 16D:
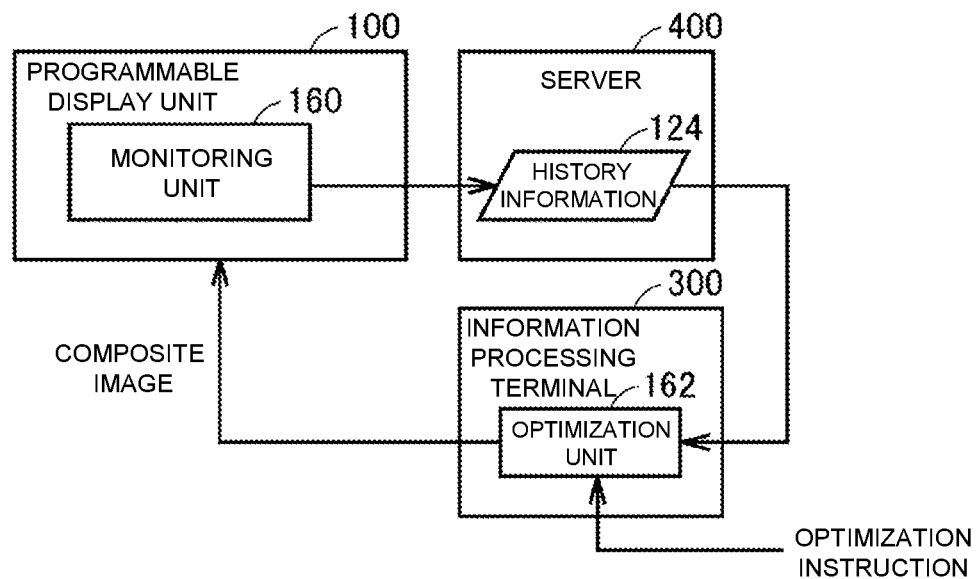

As yet another example, as illustrated in FIG. 16D, the history information 124 may be stored in the server 400, and the optimization unit 162 may be mounted in the information processing apparatus 300. In such a case, the optimization unit 162 is mounted as one function of a UI developing tool installed in the information processing apparatus 300. The optimization unit 162 reads the history information 124 from the server 400 at a timing at which a build operation is received by the UI developing tool and performs an optimization process. The information processing apparatus 300 transmits a composite image updated using the optimization process to the programmable display unit 100.

D. Summary of Fourth Embodiment

As above, the programmable display unit 100 according to this embodiment monitors the use statuses of object images on the UI, specifies object images of which the use frequencies are relatively high from among object images serving as composition sources of the current composite image on the basis of the statuses, and generates a composite image from the object images again. Accordingly, since only objects images having high possibilities of being used by the user can be expanded in the cache memory or the storage, the use efficiency of the memory is improved.

Fifth Embodiment

A. Overview

Each of the information processing apparatuses 300 according to the third and fourth embodiments, at the time of performing a build process, specifies object images having high possibilities of being used by the user among object images arranged on the generation screen 20 (see FIG. 2) of the UI and generates a composite image from the object images. In contrast to this, an information processing apparatus 300 according to a fifth embodiment is configured to select object images used for the generation of a composite image.

Other points are the same as those of the information processing apparatuses 300 according to the first to fourth embodiments, and, hereinafter, description thereof will not be repeated.

B. UI Development Environment

Figure 17:
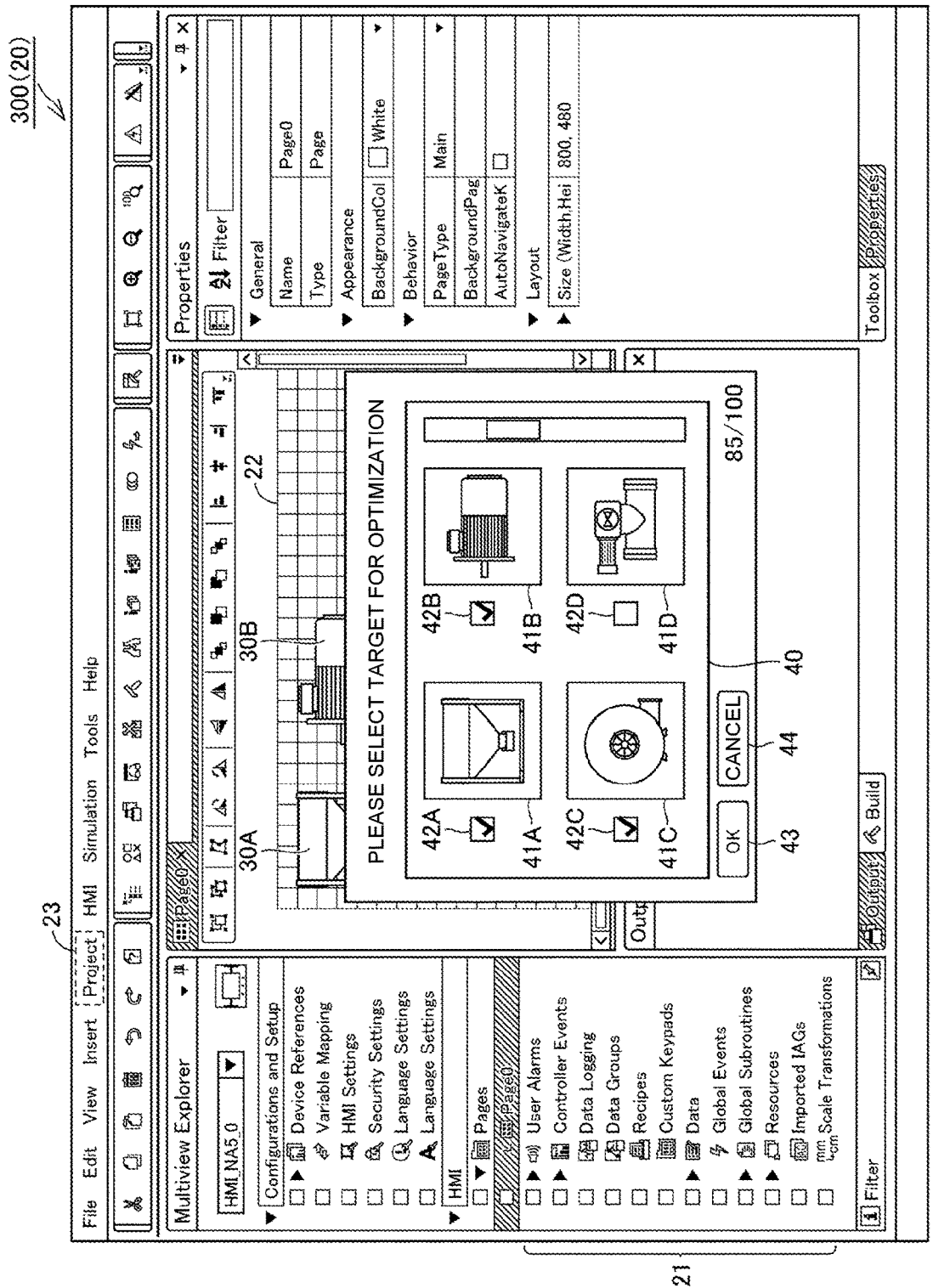
FIG. 17 is a diagram illustrating a generation screen of a UI of an information processing apparatus according to a fifth embodiment.

The information processing apparatus 300 according to the fifth embodiment will be described with reference to FIG. 17. FIG. 17 is a diagram illustrating a generation screen 20 of a UI of the information processing apparatus 300 according to the fifth embodiment.

As illustrated in FIG. 17, when a designer performs a build operation of the generation screen 20 (see FIG. 2) of the UI, the information processing apparatus 300 displays a selection screen 40 (selection receiving unit) for receiving an operation for selecting object images to be included in a composite image from among object images 30A to 30D arranged on the generation screen 20.

The selection screen 40 includes an object image 41A representing the object image 30A, an object image 41B representing the object image 30B, an object image 41C representing the object image 30C, and an object image 41D representing the object image 30D. In the object images 41A to 41D, check boxes 42A to 42D are respectively disposed. By selecting (checking) the check boxes 42A to 42D, a designer can individually select object images to be used for the composition. In the example illustrated in FIG. 17, the object images 41A to 41C are selected, but the object image 41D is not selected.

When pressing of an OK button 43 is detected, the information processing apparatus 300 starts a build process and generates a composite image from the selected object images 41A to 41C. When pressing of a cancel button 44 is detected, the information processing apparatus 300 stops the build process and closes the selection screen 40.

C. Summary of Fifth Embodiment

As above, the information processing apparatus 300 according to this embodiment is configured to be able to select object images to be used for composition. Accordingly, a designer can select arbitrary object images to be used for the composition, and the degree of freedom of design is increased.

The embodiments described here should be considered not to be limited and to be exemplary in every aspect. The scope of the invention is represented not by the description presented above but by the claims and is intended to include equivalent meanings and alterations thereto within the scope of the claims.

What is claimed is:

1. An information processing apparatus, adapted to provide a development environment for generating a user interface used for receiving an operation for an apparatus serving as a control target, the information processing apparatus comprising:
   a display unit, displaying a generation screen for generating the user interface;

a storage unit, storing a plurality of object images serving as candidates for configuring the user interface;

an operation receiving unit, receiving a selection of arbitrary object images among the plurality of object images and receiving an operation through the generation screen to select positions on the generation screen for arranging the selected object images, wherein the selected positions are changeable based on the operation;

a build unit, outputting an execution file used for configuring a user interface including the object images arranged on the generation screen on the basis of reception of a build instruction for the user interface, wherein, when the build instruction is received in a state in which two or more object images among the plurality of object images are arranged on the generation screen, the build unit generates a composite image including the two or more object images and further outputs the composite image and coordinate information of each of the object images serving as composition sources inside the composite image, wherein the composite image comprises a first composite image and a second composite image, the build unit specifies a first object image among the two or more object images having a number of times of being referred to inside the generation screen greater than or equal to a predetermined value, specifies a second object image among the two or more object images having the number of times of being referred to inside the generation screen smaller than the predetermined value, generates the first composite image from the first object image and generates the second composite image from the second object image; and a configuration unit, acquiring the object ages serving as the composition sources from the composite image on the basis of the coordinate information and arranging each of the object images serving as the composition sources in the user interface when receiving an execution instruction for the execution file.

2. The information processing apparatus according to claim 1, wherein the generation screen comprises a plurality of pages, and the operation receiving unit is configured to receive the selection of the two or more object images and the operation to select the positions of the two or more object images on any page among the plurality of pages.

3. The information processing apparatus according to claim 2, further comprising:

an optimization unit, acquiring history information defining a use status of a user for each of the object images inside the user interface, specifying a plurality of object images having a high use frequency of the user among the object images serving as the composition sources on the basis of the use statuses, and re-generating the composite image from the plurality of object images.

4. The information processing apparatus according to claim 3, further comprising:

a selection receiving unit, receiving an operation for selecting object images to be included in the composite image from among the object images arranged on the generation screen.

5. The information processing apparatus according to claim 1, further comprising:

an optimization unit, acquiring history information defining a use status of a user for each of the object images inside the user interface, specifying a plurality of object images having a high use frequency of the user among the object images serving as the composition sources on the basis of the use statuses, and re-generating the composite image from the plurality of object images.

6. The information processing apparatus according to claim 5, further comprising:

a selection receiving unit, receiving an operation for selecting object images to be included in the composite image from among the object images arranged on the generation screen.

7. The information processing apparatus according to claim 1, further comprising:

a selection receiving unit, receiving an operation for selecting object images to be included in the composite image from among the object images arranged on the generation screen.

8. An information processing system, adapted to provide a development environment for generating a user interface used for receiving an operation for an apparatus serving as a control target, the information processing system comprising:

a display unit, displaying a generation screen for generating the user interface;

a storage unit, storing a plurality of object images serving as candidates for configuring the user interface;

an operation receiving unit, receiving a selection of arbitrary object images among the plurality of object images and receives an operation through the generation screen to select positions on the generation screen for arranging the selected object images, wherein the selected positions are changeable based on the operation;

a build unit, outputting an execution file used for configuring a user interface including object images arranged on the generation screen on the basis of reception of a build instruction for the user interface, wherein, when the build instruction is received in a state in which two or more object images among the plurality of object images are arranged on the generation screen, the build unit generates a composite image including the two or more object images and further outputs the composite image and coordinate information of each of the object images serving as composition sources inside the composite image, wherein the composite image comprises a first composite image and a second composite image, the build unit specifies a first object image among the two or more object images having a number of times of being referred to inside the generation screen greater than or equal to a predetermined value, specifies a second object image among the two or more object images having the number of times of being referred to inside the generation screen smaller than the predetermined value, generates the first composite image from the first object image and generates the second composite image from the second object image; and a configuration unit, acquiring the object images serving as the composition sources from the composite image on the basis of the coordinate information and arranging each of the object images serving as the composition sources in the user interface when receiving an execution instruction for the execution file.

9. A method for generating a user interface used for receiving an operation for an apparatus serving as a control target, the method comprising:

displaying a generation screen for generating the user interface;

preparing a plurality of object images serving as candidates for configuring the user interface;

receiving a selection of arbitrary object images among the plurality of object images and receiving an operation through the generation screen to select positions on the generation screen for arranging the selected object images, wherein the selected positions are changeable based on the operation;

outputting an execution file used for configuring a user interface including the object images arranged on the generation screen on the basis of reception of a build instruction for the user interface, wherein the outputting of the execution file comprises generating a composite image including two or more object images and further outputting the composite image and coordinate information of each of the object images serving as composition sources inside the composite image when the build instruction is received in a state in which the two or more object images among the plurality of object images are arranged on the generation screen, wherein the composite image comprises a first composite image and a second composite image, and generating the composite image comprises:

specifying a first object image among the two or more object images having a number of times of being referred to inside the generation screen greater than or equal to a predetermined value;

specifying a second object image among the two or more object images having the number of times of being referred to inside the generation screen smaller than the predetermined value;

generating the first composite image from the first object image; and generating the second composite image from the s second object image; and acquiring the object images serving as the composition sources from the composite image on the basis of the coordinate information and arranging each of the object images serving as the composition sources in the user interface when receiving an execution instruction for the execution file.

10. A non-transitory recording medium, storing a program for generating a user interface used for receiving an operation for an apparatus serving as a control target, the program causing the apparatus to perform:

displaying a generation screen for generating the user interface;

preparing a plurality of object images serving as candidates for configuring the user interface;

receiving a selection of arbitrary object images among the plurality of object images and receiving an operation through the generation screen to select positions on the generation screen for arranging the selected object images, wherein the selected positions are changeable based on the operation;

outputting an execution file used for configuring a user interface including the object images arranged on the generation screen on the basis of reception of a build instruction for the user interface, wherein the outputting of the execution file comprises generating a composite image including two or more object images and further outputting the composite image and coordinate information of each of the object images serving as composition sources inside the composite image when the build instruction is received in a state in which the two or more object images among the plurality of object images are arranged on the generation screen, wherein the composite image comprises a first composite image and a second composite image, and generating the composite image comprises:

specifying a first object image among the two or more object images having a number of times of being referred to inside the generation screen greater than or equal to a predetermined value;

specifying a second object image among the two or more object images having the number of times of being referred to inside the generation screen smaller than the predetermined value;

generating the first composite image from the first object image; and generating the second composite image from the s second object image; and acquiring the object images serving as the composition sources from the composite image on the basis of the coordinate information and arranging each of the object images serving as the composition sources in the user interface when receiving an execution instruction for the execution file.

* * * * *